United States Patent
Wei et al.

(10) Patent No.: US 12,375,999 B2
(45) Date of Patent: Jul. 29, 2025

(54) COST-BASED ROUTE SELECTION FOR IAB NODE MIGRATION

(71) Applicant: Sony Group Corporation, Tokyo (JP)

(72) Inventors: Yuxin Wei, Basingstoke (GB); Vivek Sharma, Basingstoke (GB); Hideji Wakabayashi, Basingstoke (GB); Yassin Aden Awad, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 408 days.

(21) Appl. No.: 17/917,267

(22) PCT Filed: Mar. 25, 2021

(86) PCT No.: PCT/EP2021/057688
§ 371 (c)(1),
(2) Date: Oct. 6, 2022

(87) PCT Pub. No.: WO2021/219299
PCT Pub. Date: Nov. 4, 2021

(65) Prior Publication Data
US 2023/0180096 A1 Jun. 8, 2023

(30) Foreign Application Priority Data
Apr. 27, 2020 (EP) .................................... 20171666

(51) Int. Cl.
*H04W 40/22* (2009.01)
*H04W 40/04* (2009.01)

(52) U.S. Cl.
CPC ........... *H04W 40/22* (2013.01); *H04W 40/04* (2013.01)

(58) Field of Classification Search
CPC ... H04W 40/22; H04W 40/04; H04W 84/047; H04W 84/22; H04W 88/14; H04L 12/4633; H04L 47/283
See application file for complete search history.

(56) References Cited

U.S. PATENT DOCUMENTS

2015/0208316 A1 7/2015 Mosko et al.
2016/0135107 A1* 5/2016 Hampel .............. H04L 12/4633
370/238

(Continued)

FOREIGN PATENT DOCUMENTS

CN 110740485 A 1/2020
KR 20210139444 A * 11/2021

(Continued)

OTHER PUBLICATIONS

International Search Report and Written Opinion mailed on Jun. 25, 2021, received for PCT Application PCT/EP2021/057688, filed on Mar. 25, 2021, 17 pages.

(Continued)

*Primary Examiner* — Ayaz R Sheikh
*Assistant Examiner* — Louis Samara
(74) *Attorney, Agent, or Firm* — XSENSUS LLP

(57) ABSTRACT

A plurality of communications nodes are configured to form a wireless backhaul network to communicate data from a core network of the wireless communications network for transmitting to one or more communications devices or to communicate data to the core network received from the one or more communications devices. At least a first and a second of the plurality of communications nodes are donor communications nodes formed from radio network infrastructure equipment having a physical connection to the core network. According to example embodiments, a migrating communications node determines that it should migrate from a first attachment point in the wireless backhaul network in which the migrating node communicates the data to or from the core network via the first donor communications node. The term "attachment point" is used to express a link of a communications node to other nodes in the backhaul network. The radio communications links are (Continued)

formed to communicate data to and from the core network via donor communications nodes and may be also via one or other nodes according to an established hierarchy of the wireless backhaul network. The migrating communications node determines a second attachment point in the wireless backhaul network to which the migrating communications node should attach to the wireless backhaul network to communicate the data to or from the core network, and the migrating communications node migrates from the first attachment point to the second attachment point. The second attachment point is determined by biasing a selection of the second attachment point either to provide the migrating communications node with radio communications resources from the first donor communications nodes when attached to the wireless backhaul network at the second attachment point as an intra-donor migration, or to provide the migrating communications node with radio communications resources from the second donor communications node when attached to the wireless backhaul network at the second attachment point as an inter-donor migration.

20 Claims, 13 Drawing Sheets

(56) References Cited

U.S. PATENT DOCUMENTS

| | | | |
|---|---|---|---|
| 2020/0120725 A1* | 4/2020 | Mildh | H04W 76/12 |
| 2020/0351750 A1* | 11/2020 | Majmundar | H04W 40/22 |
| 2020/0383030 A1* | 12/2020 | Cho | H04L 45/26 |
| 2021/0058989 A1* | 2/2021 | Simsek | H04L 47/283 |
| 2021/0195539 A1* | 6/2021 | Sheng | H04W 88/14 |
| 2022/0014976 A1* | 1/2022 | Luo | H04W 36/0044 |
| 2022/0182917 A1* | 6/2022 | Muhammad | H04W 40/248 |

FOREIGN PATENT DOCUMENTS

| | | | |
|---|---|---|---|
| KR | 20230091908 A | * | 6/2023 |
| KR | 102578298 B1 | * | 9/2023 |
| WO | 2020/089225 A1 | | 5/2020 |

OTHER PUBLICATIONS

AT&T et al., "New SID Proposal: Study on Integrated Access and Backhaul for NR", 8881123GPP TSG RAN Meeting #75, RP-170821, Mar. 6-9, 2017, 5 pages.
3Gpp, "Study on Integrated Access and Backhaul; (Release 15)", 3GPP TR 38.874 V0.1.0, Feb. 2018, pp. 1-11.
Qualcomm, "New WID on Enhancements to Integrated Access and Backhaul", 3GPP TSG RAN Meeting #86, RP-193251, Dec. 9-12, 2019, 5 pages.
IEEE, "Bridges and Bridged Networks", IEEE Computer Society, IEEE Std 802.1Q™-2014, Dec. 2014, pp. 1-1767.
3GPP, "NR; Study on Integrated Access and Backhaul; (Release16) ", 3GPP TR 38.874 V16.0.0, Dec. 2018, pp. 1-111.
Holma et al., "LTE for UMTS OFDMA and SC-FDMA Based Radio Access", John Wiley & Sons, 2009, 232 pages.
Qualcomm et al., "Proposals on IAB Architecture", 3GPP TSG-RAN WG2 NR Ad hoc 1801, R2-1801606, Jan. 22-26, 2018, 7 pages.
Qualcomm et al., "Way Forward—IAB Architecture for L2/3 relaying", 3GPP TSG-RAN WG3 Meeting #99, R3-181502, Jan. 26-Mar. 2, 2018, 6 pages.
Huawei et al., "Revised work item proposal: Enhancements of NB-IoT", 3GPP TSG RAN Meeting #73, RP-161901, Sep. 19-22, 2016, 7 pages.
Samsung, "Overview on IAB node migration", 3GPP TSG-RAN WG3 Meeting #105bis, R3-195000, Oct. 14-18, 2019, 4 pages.
Sony, "Route management in IAB", 3GPP TSG-RAN WG2 Meeting #103, R2-1811418, Aug. 20-24, 2018, 3 pages.
VIVO, "IAB Topology and Routing Management", 3GPP TSG-RAN WG2 Meeting #103, R2-1811778, Aug. 20-24, 2018, 4 pages.

* cited by examiner

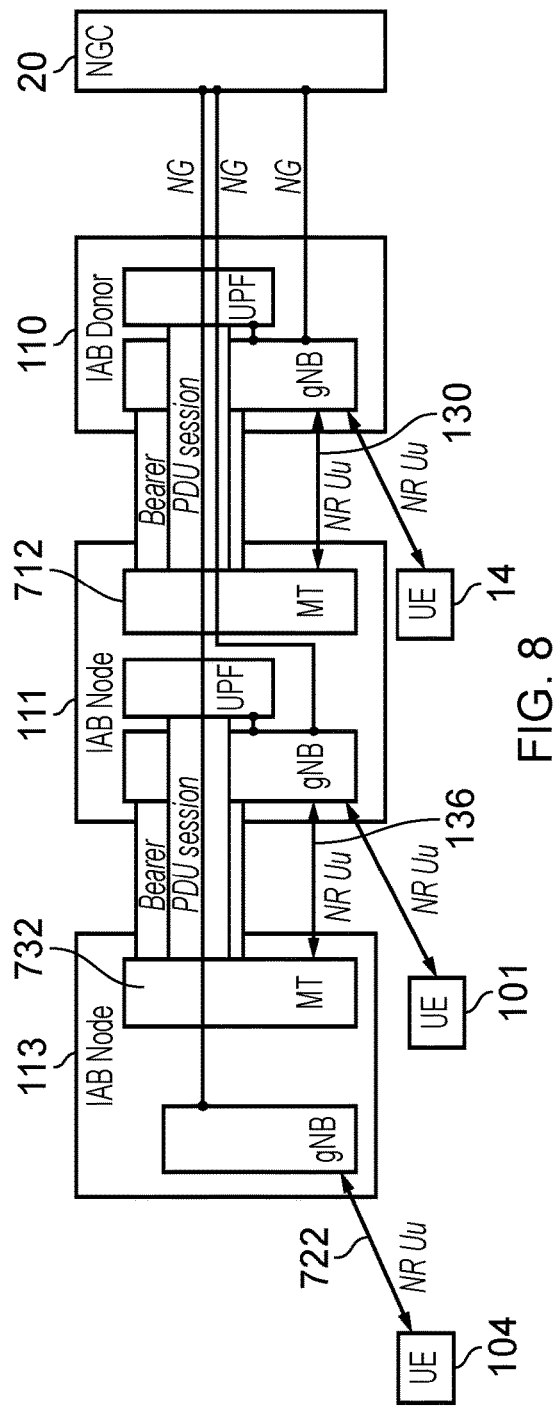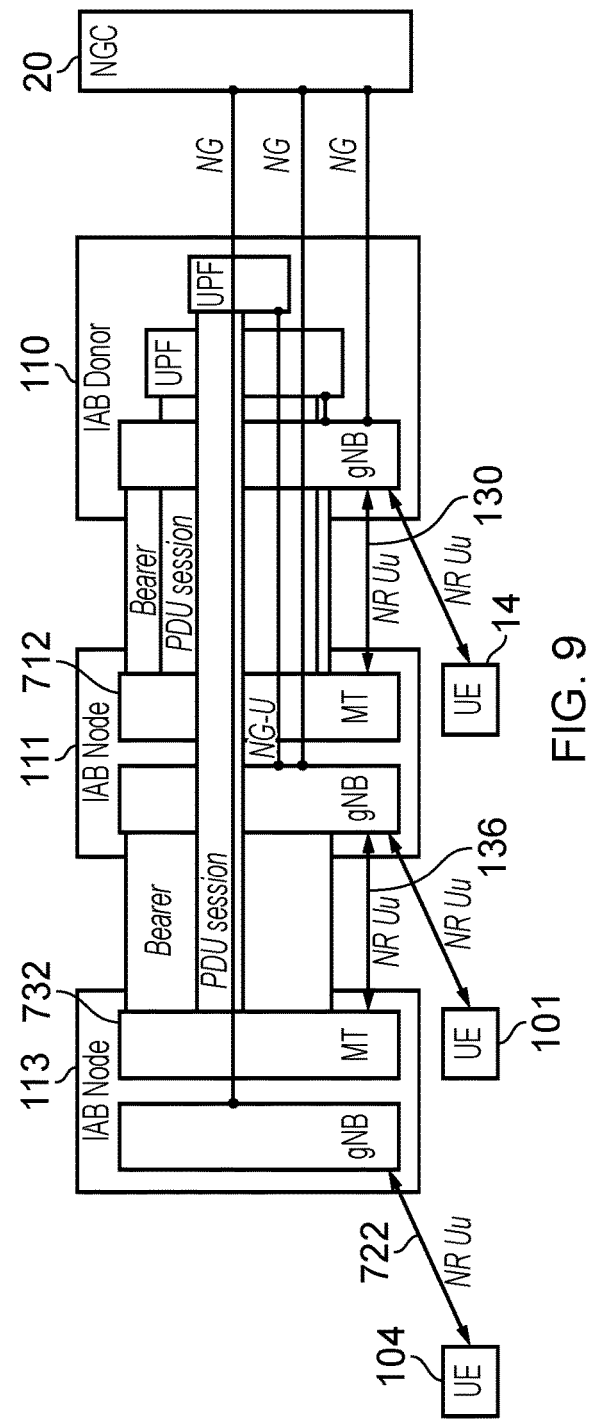
FIG. 8
FIG. 9

| Destination | Route Cost | Next Hop | Change of donor? |
|---|---|---|---|
| Core Network | 8 | First Relay | No |
| Core Network | 4 | Third Relay | Yes |

1202 (row 1), 1204 (row 2)

FIG. 14

COST-BASED ROUTE SELECTION FOR IAB NODE MIGRATION

CROSS-REFERENCE TO RELATED APPLICATIONS

The present application is based on PCT filing PCT/EP2021/057688, filed Mar. 25, 2021, which claims priority to EP 20171666.9, filed Apr. 27, 2020, the entire contents of each are incorporated herein by reference.

BACKGROUND

Field of Disclosure

The present disclosure relates to methods and apparatus for the communication of signals between various infrastructure equipment, communications devices and a core network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recent generation mobile telecommunication systems, such as those based on the 3GPP defined UMTS and Long Term Evolution (LTE) architectures, are able to support a wider range of services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. In addition to supporting these kinds of more sophisticated services and devices, it is also proposed for newer generation mobile telecommunication systems to support less complex services and devices which make use of the reliable and wide ranging coverage of newer generation mobile telecommunication systems without necessarily needing to rely on the high data rates available in such systems. The demand to deploy such networks is therefore strong and the coverage area of these networks, i.e. geographic locations where access to the networks is possible, may be expected to increase ever more rapidly.

Future wireless communications networks will therefore be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

As radio technologies continue to improve, for example with the development of 5G, the possibility arises for these technologies to be used not only by infrastructure equipment to provide service to wireless communications devices in a cell, but also for interconnecting infrastructure equipment to provide a wireless backhaul. In view of this, there is a need to ensure that links between various infrastructure equipment in the backhaul are both stable and reliable, particularly where an infrastructure equipment connected to the core network through another of the infrastructure equipment moves away from this infrastructure equipment, or otherwise requires a different connection to the core network.

SUMMARY OF THE DISCLOSURE

The present disclosure can help address or mitigate at least some of the issues discussed above as defined in the appended claims.

Embodiments of the present technique can provide a method of communicating in a wireless communications network. The method comprises configuring a plurality of communications nodes to form a wireless backhaul network to communicate data from a core network of the wireless communications network for transmitting to one or more communications devices or to communicate data to the core network received from the one or more communications devices, at least a first and a second of the plurality of communications nodes being donor communications nodes formed from radio network infrastructure equipment having a physical connection to the core network. According to example embodiments, a migrating communications node or a first donor communications node determines that the migrating node should migrate from a first attachment point in the wireless backhaul network in which the migrating node communicates the data to or from the core network via the first donor communications node. The term "attachment point" is used to express a link of a communications node to other nodes in the backhaul network. For example a communications node may have a radio communications link to a donor node and other communications nodes may have radio communications links to that node as child nodes. The radio communications links are formed to communicate data to and from the core network via donor communications nodes and may be also via one or other nodes according to an established hierarchy of the wireless backhaul network. The migrating communications node or the first donor communications node determines a second attachment point in the wireless backhaul network to which the migrating communications node should attach to the wireless backhaul network to communicate the data to or from the core network, and the migrating communications node migrates from the first attachment point to the second attachment point. The determining the second attachment point includes biasing a selection of the second attachment point either to provide the migrating communications node with radio communications resources from the first donor communications nodes when attached to the wireless backhaul network at the second attachment point as an intra-donor migration, or to provide the migrating communications node with radio communications resources from the second donor communications node when attached to the wireless backhaul network at the second attachment point as an inter-donor migration.

Example embodiments can therefore influence a migration of a communications node in a wireless backhaul network to either make it more likely that the migration will be intra-donor node or that the migration will be inter-donor node. For example, it will be appreciated that because the donor nodes are providing the radio communications resources to the communications nodes forming the wireless backhaul network which are communicating to and from the core network, an inter-donor node migration will require an increase in signalling overhead compared to an intra-donor node migration. Accordingly the selecting the second attachment point may be biased to be an intra-donor node migration rather than an inter-donor node migration.

In some examples, the selection of the attachment point may be made by a donor node, whereas in other examples the selection of the attachment point may be made by the migrating node.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 8 is a block diagram illustrating a second possible network architecture for providing a wireless backhaul by means of TAB in a wireless telecommunication network which may be configured to operate in accordance with certain embodiments of the present disclosure;

FIG. 9 is a block diagram illustrating a third possible network architecture for providing a wireless backhaul by means of TAB in a wireless telecommunication network which may be configured to operate in accordance with certain embodiments of the present disclosure;

FIG. 14 illustrates an example of a routing table according to some embodiments.

DETAILED DESCRIPTION OF THE EMBODIMENTS

Long Term Evolution (LTE) Wireless Communications System

Figure 1:
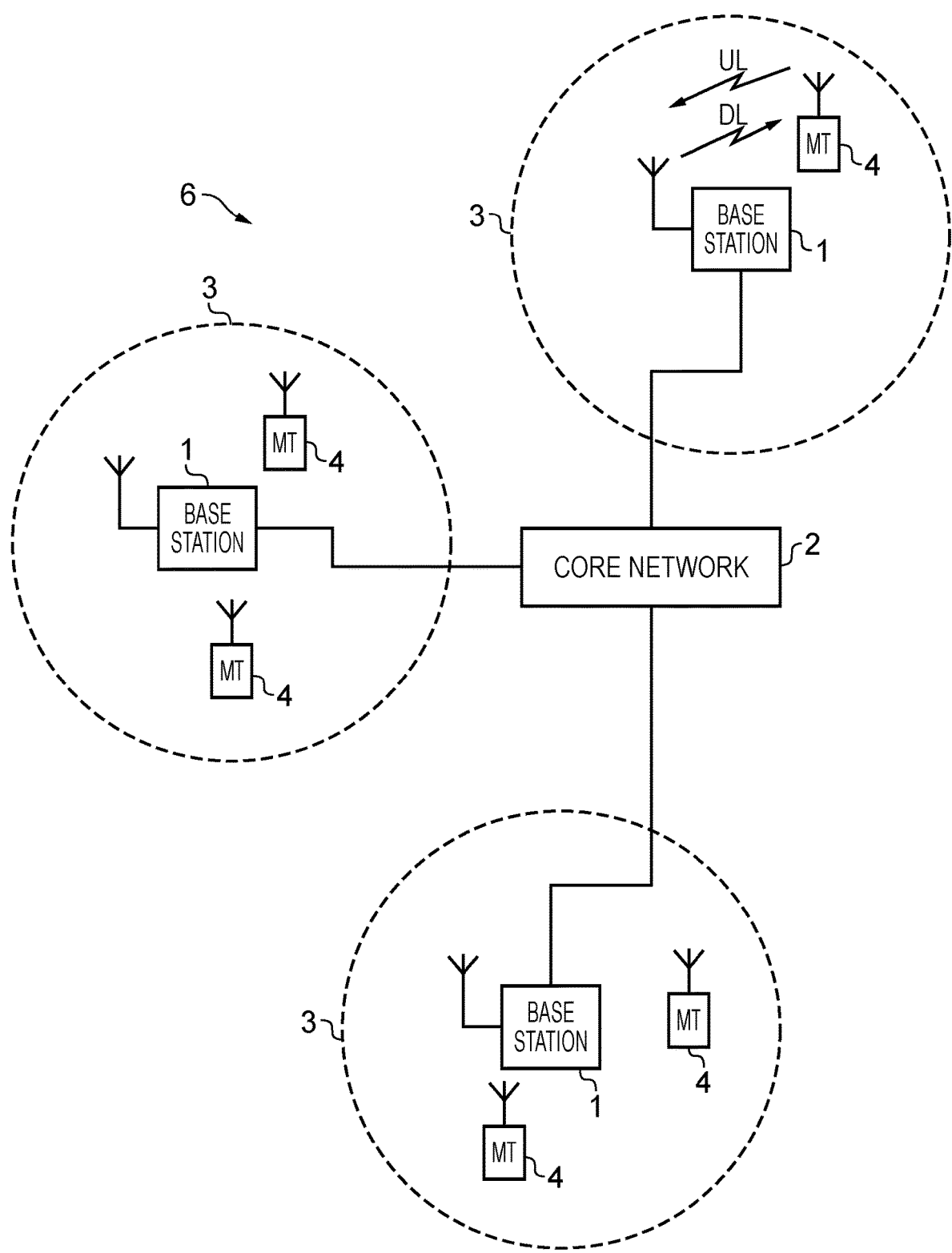
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [1]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4.

Although each base station 1 is shown in FIG. 1 as a single entity, the skilled person will appreciate that some of the functions of the base station may be carried out by disparate, inter-connected elements, such as antennas (or antennae), remote radio heads, amplifiers, etc. Collectively, one or more base stations may form a radio access network.

Data is transmitted from base stations 1 to communications devices 4 within their respective coverage areas 3 via a radio downlink Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth.

Services provided by the core network 2 may include connectivity to the internet or to external telephony services. The core network 2 may further track the location of the communications devices 4 so that it can efficiently contact (i.e. page) the communications devices 4 for transmitting downlink data towards the communications devices 4.

Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) Wireless Communications System

Figure 2:
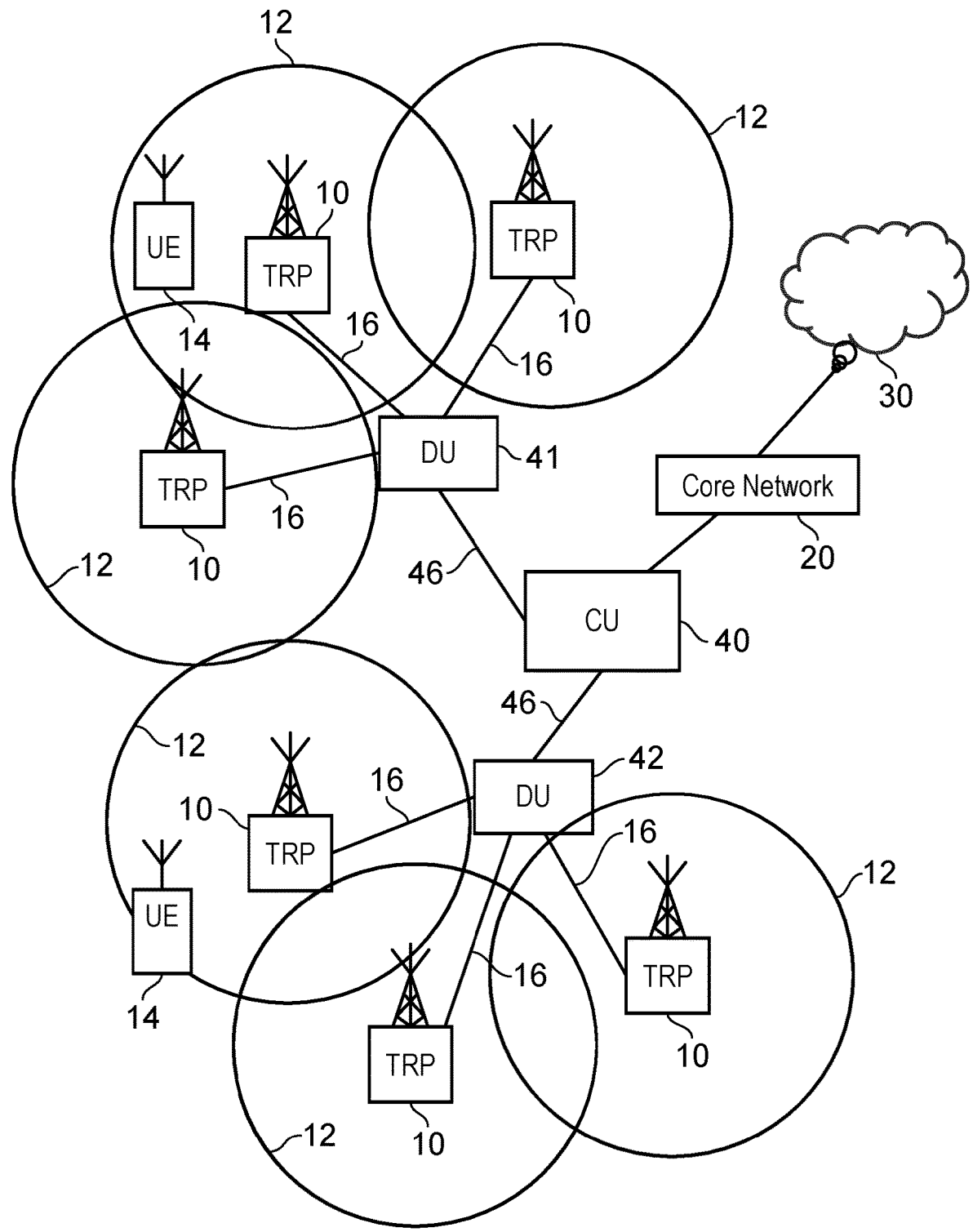
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a circle 12. As such, wireless communications devices 14 which are within a radio communications range provided by the cells 12 can transmit and receive signals to and from the TRPs 10 via the wireless access interface. Each of the distributed units 41, 42 are connected to a central unit (CU) 40 (which may be referred to as a controlling node) via an interface 46. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to the UE devices 4 known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 20 connected to the new RAT telecommunications system represented in FIG. 2 may be broadly considered to correspond with the core network 2 represented in FIG. 1, and the respective central units 40 and their associated distributed units/TRPs 10 may be broadly considered to provide functionality corresponding to the base stations 1 of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/central unit and/or the distributed units/TRPs. A communications device 14 is represented in FIG. 2 within the coverage area of the first communication cell 12. This communications device 14 may thus exchange signalling with the first central unit 40 in the first communication cell 212 via one of the distributed units 10 associated with the first communication cell 12.

It will further be appreciated that FIG. 2 represents merely one example of a proposed architecture for a new RAT based telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 1 as shown in FIG. 1 which is adapted to provide functionality in accordance with the principles described herein, and in other examples the network infrastructure equipment may comprise a control unit/controlling node 40 and/or a TRP 10 of the kind shown in FIG. 2 which is adapted to provide functionality in accordance with the principles described herein.

Figure 3:
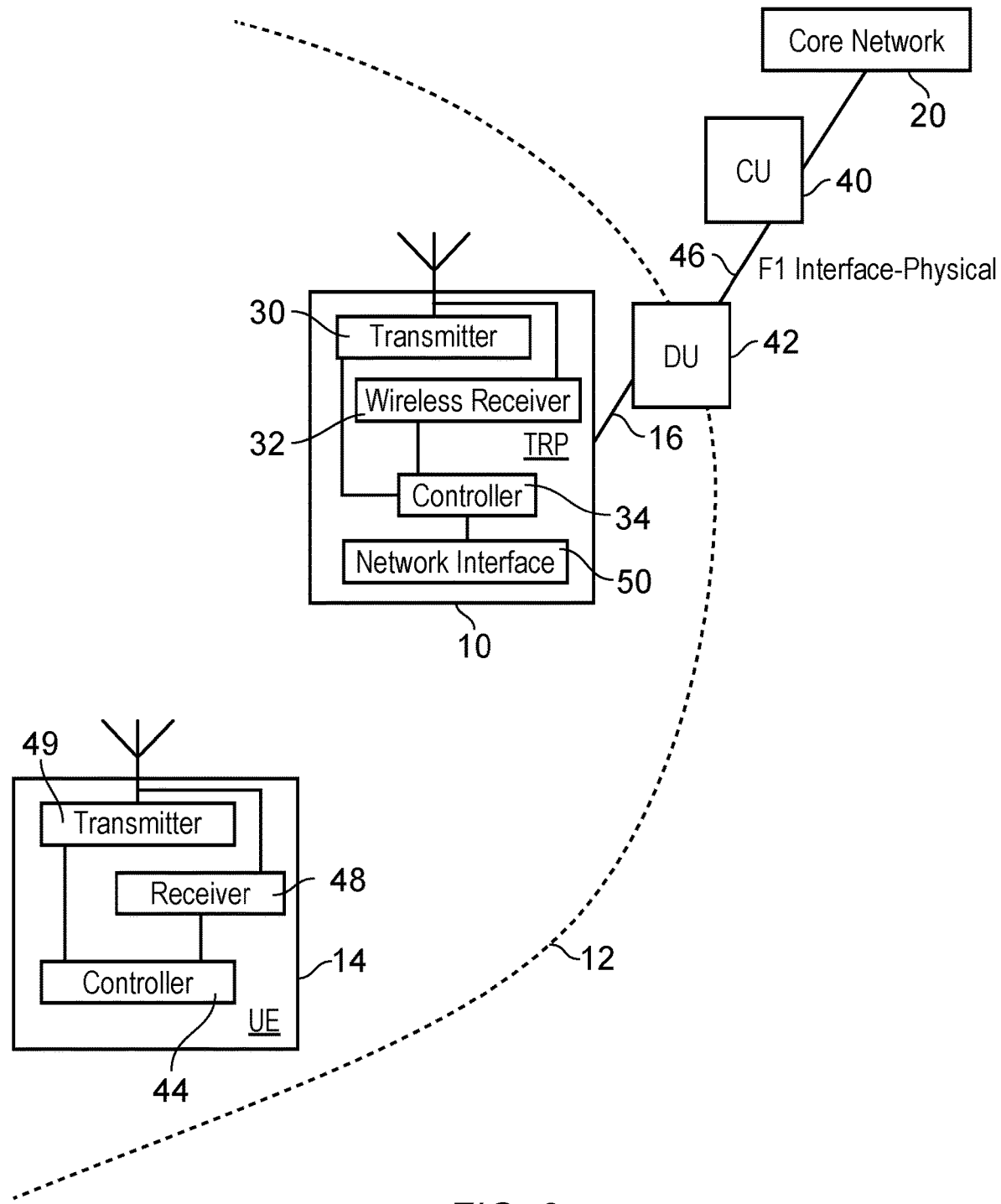
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3, a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 49, a receiver 48 and a controller 44 which is configured to control the transmitter 49 and the receiver 48 to transmit signals representing uplink data to the wireless communications network via the wireless access interface formed by the TRP 10 and to receive downlink data as signals transmitted by the transmitter 30 and received by the receiver 48 in accordance with the conventional operation.

The transmitters 30, 49 and the receivers 32, 48 (as well as other transmitters, receivers and transceivers described in relation to examples and embodiments of the present disclosure) may include radio frequency filters and amplifiers as well as signal processing components and devices in order to transmit and receive radio signals in accordance for example with the 5G/NR standard. The controllers 34, 44, 48 (as well as other controllers described in relation to examples and embodiments of the present disclosure) may be, for example, a microprocessor, a CPU, or a dedicated chipset, etc., configured to carry out instructions which are stored on a computer readable medium, such as a non-volatile memory. The processing steps described herein may be carried out by, for example, a microprocessor in conjunction with a random access memory, operating according to instructions stored on a computer readable medium.

As shown in FIG. 3, the TRP 10 also includes a network interface 50 which connects to the DU 42 via a physical interface 16. The network interface 50 therefore provides a communication link for data and signalling traffic from the TRP 10 via the DU 42 and the CU 40 to the core network 20.

The interface 46 between the DU 42 and the CU 40 is known as the F1 interface which can be a physical or a logical interface. The F1 interface 46 between CU and DU may operate in accordance with specifications 3GPP TS 38.470 and 3GPP TS 38.473, and may be formed from a fibre optic or other wired high bandwidth connection. In one example the connection 16 from the TRP 10 to the DU 42 is via fibre optic. The connection between a TRP 10 and the core network 20 can be generally referred to as a backhaul, which comprises the interface 16 from the network interface 50 of the TRP 10 to the DU 42 and the F1 interface 46 from the DU 42 to the CU 40.

Figure 4:
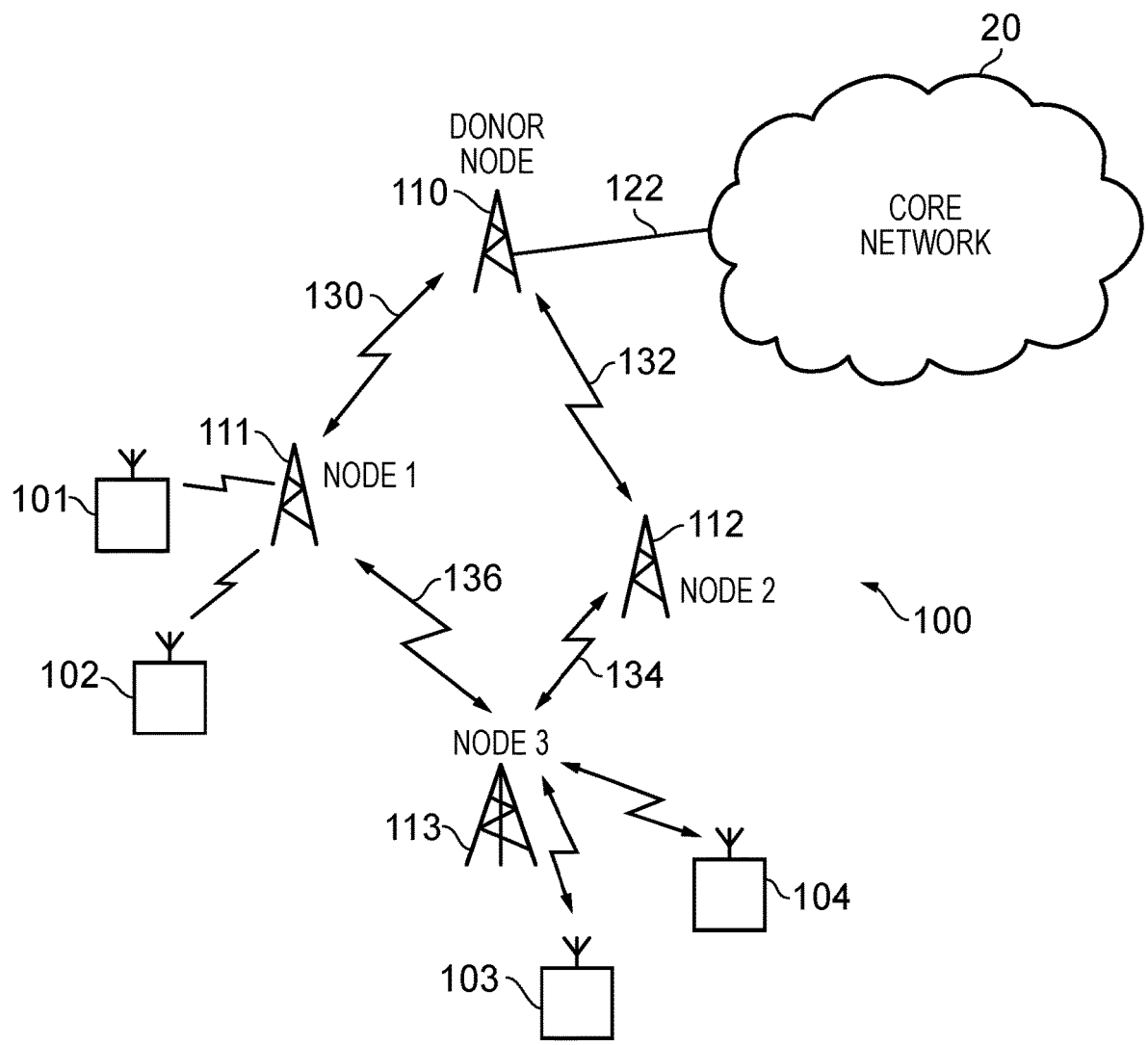
FIG. 4 schematically represents some aspects of an example wireless telecommunication network which may be configured to operate in accordance with certain embodiments of the present disclosure.

Example arrangements of the present technique can be formed from a wireless communications network corresponding to that shown in FIG. 1 or 2, as shown in FIG. 4. FIG. 4 provides an example in which cells of a wireless communications network are formed from infrastructure equipment which are provided with an Integrated Access and Backhaul (IAB) capability. The wireless communications network 100 comprises the core network 20 and a first, a second, a third and a fourth communications device (respectively 101, 102, 103 and 104) which may broadly correspond to the communications devices 4, 14 described above.

The wireless communications network 100 comprises a radio access network, comprising a first infrastructure equipment 110, a second infrastructure equipment 111, a third infrastructure equipment 112, and a fourth infrastructure equipment 113. Each of the infrastructure equipment provides a coverage area (i.e. a cell, not shown in FIG. 4) within which data can be communicated to and from the communications devices 101 to 104. For example, the fourth infrastructure equipment 113 provides a cell in which the third and fourth communications devices 103 and 104 may obtain service. Data is transmitted from the fourth infrastructure equipment 113 to the fourth communications device 104 within its respective coverage area (not shown) via a radio downlink Data is transmitted from the fourth communications device 104 to the fourth infrastructure equipment 113 via a radio uplink.

The infrastructure equipment 110 to 113 in FIG. 4 may correspond broadly to the TRPs 10 of FIG. 2 and FIG. 3.

The first infrastructure equipment 110 in FIG. 4 is connected to the core network 20 by means of one or a series of physical connections. The first infrastructure equipment 110 may comprise the TRP 10 (having the physical connection 16 to the DU 42) in combination with the DU 42 (having a physical connection to the CU 40 by means of the F1 interface 46) and the CU 40 (being connected by means of a physical connection to the core network 20).

However, there is no direct physical connection between any of the second infrastructure equipment 111, the third infrastructure equipment 112, and the fourth infrastructure equipment 113 and the core network 20. As such, it may be necessary (or, otherwise determined to be appropriate) for data received from a communications device (i.e. uplink data), or data for transmission to a communications device (i.e. downlink data) to be transmitted to or from the core network 20 via other infrastructure equipment (such as the first infrastructure equipment 110) which has a physical connection to the core network 20, even if the communications device is not currently served by the first infrastructure equipment 110 but is, for example, in the case of the wireless communications device 104, served by the fourth infrastructure equipment 113.

The second, third and fourth infrastructure equipment 111 to 113 in FIG. 4 may each comprise a TRP, broadly similar in functionality to the TRPs 10 of FIG. 2.

In some arrangements of the present technique, one or more of the second to fourth infrastructure equipment 111 to 113 in FIG. 4 may further comprise a DU 42, and in some arrangements of the present technique, one or more of the second to fourth infrastructure equipment 110 to 113 may comprise a DU and a CU.

In some arrangements of the present technique, the CU 40 associated with the first infrastructure equipment 110 may perform the function of a CU not only in respect of the first infrastructure equipment 110, but also in respect of one or more of the second, the third and the fourth infrastructure equipment 111 to 113.

In order to provide the transmission of the uplink data or the downlink data between a communications device and the core network, a route is determined by any suitable means, with one end of the route being an infrastructure equipment physically connected to a core network and by which uplink and downlink traffic is routed to or from the core network.

In the following, the term 'node' is used to refer to an entity or infrastructure equipment which forms a part of a route for the transmission of the uplink data or the downlink data.

An infrastructure equipment which is physically connected to the core network and operated in accordance with an example arrangement may provide communications resources to other infrastructure equipment and so is referred to as a 'donor node'. An infrastructure equipment which acts as an intermediate node (i.e. one which forms a part of the route but is not acting as a donor node) is referred to as a 'relay node'. It should be noted that although such intermediate node infrastructure equipment act as relay nodes on the backhaul link, they may also provide service to communications devices. The relay node at the end of the route which is the infrastructure equipment controlling the cell in which the communications device is obtaining service is referred to as an 'end node'.

In the wireless network illustrated in FIG. 4, each of the first to fourth infrastructure equipment 110 to 113 may therefore function as nodes. For example, a route for the transmission of uplink data from the fourth communications device 104 may consist of the fourth infrastructure equipment 113 (acting as the end node), the third infrastructure equipment 112 (acting as a relay node), and the first infrastructure equipment 110 (acting as the donor node). The first infrastructure 110, being connected to the core network 20, transmits the uplink data to the core network 20.

For clarity and conciseness in the following description, the first infrastructure equipment 110 is referred to below as the 'donor node', the second infrastructure equipment 111 is referred to below as 'Node 1', the third infrastructure equipment 112 is referred to below as 'Node 2' and the fourth infrastructure equipment 113 is referred to below as 'Node 3'.

For the purposes of the present disclosure, the term 'upstream node' is used to refer to a node acting as a relay node or a donor node in a route, which is a next hop when used for the transmission of data via that route from a wireless communications device to a core network. Similarly, 'downstream node' is used to refer to a relay node from which uplink data is received for transmission to a core network. For example, if uplink data is transmitted via a route comprising (in order) the Node 3 113, the Node 1 111 and the donor node 110, then the donor node 110 is an upstream node with respect to the Node 1 111, and the Node 3 113 is a downstream node with respect to the Node 1 111.

More than one route may be used for the transmission of the uplink/downlink data from/to a given communications device; this is referred to herein as 'multi-connectivity'. For example, the uplink data transmitted by the wireless communications device 104 may be transmitted either via the Node 3 113 and the Node 2 112 to the donor node 110, or via the Node 3 113 and the Node 1 111 to the donor node 110.

In the following description, example arrangements are described in which each of the nodes is an infrastructure equipment; the present disclosure is not so limited. A node may comprise at least a transmitter, a receiver and a controller. In some arrangements of the present technique, the functionality of a node (other than the donor node) may be carried out by a communications device, which may be the communications device 4 (of FIG. 1) or 14 (of FIG. 2), adapted accordingly. As such, in some arrangements of the present technique, a route may comprise one or more communications devices. In other arrangements, a route may consist of only a plurality of infrastructure equipment.

In some arrangements of the present technique, an infrastructure equipment acting as a node may not provide a wireless access interface for the transmission of data to or by a communications device other than as part of an intermediate transmission along a route.

In some arrangements of the present technique, a route is defined considering a wireless communications device (such as the wireless communications device 104) as the start of a route. In other arrangements a route is considered to start at an infrastructure equipment which provides a wireless access interface for the transmission of the uplink data by a wireless communications device.

Each of the first infrastructure equipment acting as the donor node 110 and the second to fourth infrastructure equipment acting as the Nodes 1 to 3 111, 112, 113 may communicate with one or more other nodes by means of an inter-node wireless communications link, which may also be referred to as a wireless backhaul communications links. For example, FIG. 4 illustrates four inter-node wireless communications links 130, 132, 134, 136.

Each of the inter-node wireless communications links 130, 132, 134, 136 may be provided by means of a respective wireless access interface. Alternatively, two or more of the inter-node wireless communications links 130, 132, 134, 136 may be provided by means of a common wireless access interface and in particular, in some arrangements of the present technique, all of the inter-node wireless communications links 130, 132, 134, 136 are provided by a shared wireless access interface.

A wireless access interface which provides an inter-node wireless communications link may also be used for communications between an infrastructure equipment (which may be a node) and a communications device which is served by the infrastructure equipment. For example, the fourth wireless communications device 104 may communicate with the infrastructure equipment Node 3 113 using the wireless access interface which provides the inter-node wireless communications link 134 connecting the Node 3 113 and the Node 2 112.

The wireless access interface(s) providing the inter-node wireless communications links 130, 132, 134, 136 may operate according to any appropriate specifications and techniques. In some arrangements of the present technique, a wireless access interface used for the transmission of data from one node to another uses a first technique and a wireless access interface used for the transmission of data between an infrastructure equipment acting as a node and a communications device may use a second technique different from the first. In some arrangements of the present technique, the wireless access interface(s) used for the transmission of data from one node to another and the wireless access interface(s) used for the transmission of data between an infrastructure equipment and a communications device use the same technique.

Examples of wireless access interface standards include the third generation partnership project (3GPP)-specified GPRS/EDGE ("2G"), WCDMA (UMTS) and related standards such as HSPA and HSPA+ ("3G"), LTE and related standards including LTE-A ("4G"), and NR ("5G"). Techniques that may be used to provide a wireless access interface include one or more of TDMA, FDMA, OFDMA, SC-FDMA, CDMA. Duplexing (i.e. the transmission over a wireless link in two directions) may be by means of frequency division duplexing (FDD) or time division duplexing (TDD) or a combination of both.

In some arrangements of the present technique, two or more of the inter-node wireless communications links 130, 132, 134, 136 may share communications resources. This may be because two or more of the inter-node wireless communications links 130, 132, 134, 136 are provided by means of a single wireless access interface or because two or more of the inter-node wireless communications links 130, 132, 134, 136 nevertheless operate simultaneously using a common range of frequencies.

The nature of the inter-node wireless communications links 130, 132, 134, 136 may depend on the architecture by which the wireless backhaul functionality is achieved.

Integrated Access and Backhaul (IAB) for NR

One area of NR under development is Integrated Access and Backhaul (IAB). Several requirements and aspects for the integrated access and wireless backhaul for NR to address are discussed in [3], which include:

Efficient and flexible operation for both inband and outband relaying in indoor and outdoor scenarios;
Multi-hop and redundant connectivity;
End-to-end route selection and optimisation;
Support of backhaul links with high spectral efficiency;
Support of legacy NR UEs.

The stated objective of the study detailed in [3] is to identify and evaluate potential solutions for topology management for single-hop/multi-hop and redundant connectivity, route selection and optimisation, dynamic resource allocation between the backhaul and access links, and achieving high spectral efficiency while also supporting reliable transmission.

Figure 5:
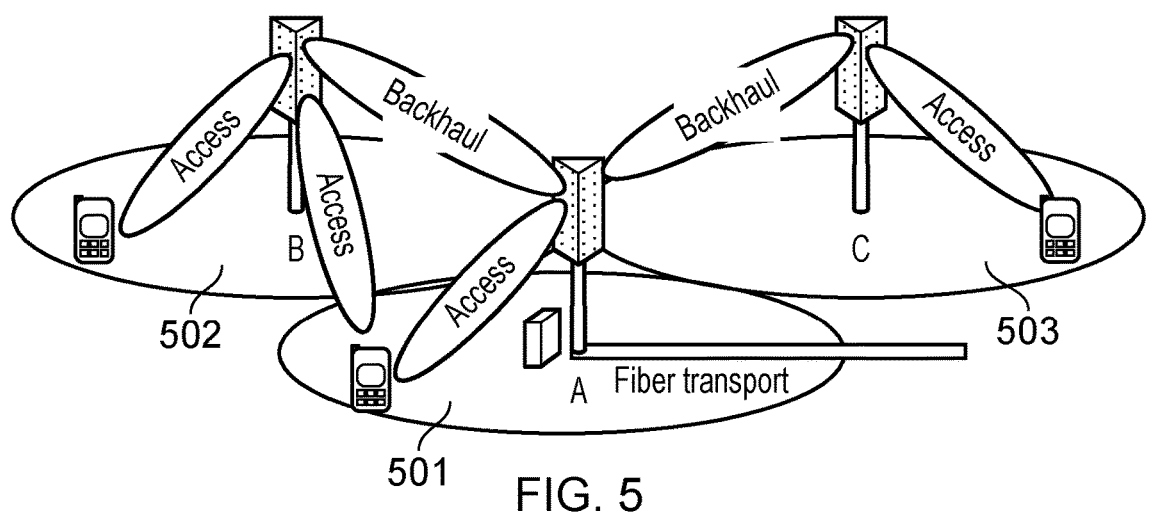
FIG. 5 is reproduced from [3], and provides a first example of an Integrated Access and Backhaul (IAB) deployment scenario.

FIG. 5 shows the scenario presented in [3], where a backhaul link is provided from cell site A 501 to cells B 502 and C 504 over the air. It is assumed that cells B 502 and C 504 have no wired backhaul connectivity. Considering the CU/DU split architecture in NR as described above, it can be assumed that all of cells A 501, B 502 and C 504 have a dedicated DU unit and are controlled by the same CU.

Several architecture requirements for IAB are laid out in [4]. These include the support for multiple backhaul hops, that topology adaptation for physically fixed relays shall be supported to enable robust operation, minimisation of impact to core network specifications, consideration of impact to core networking signalling load, and Release 15 NR specifications should be reused as much as possible in the design of the backhaul link, with enhancements considered.

Figure 6A:
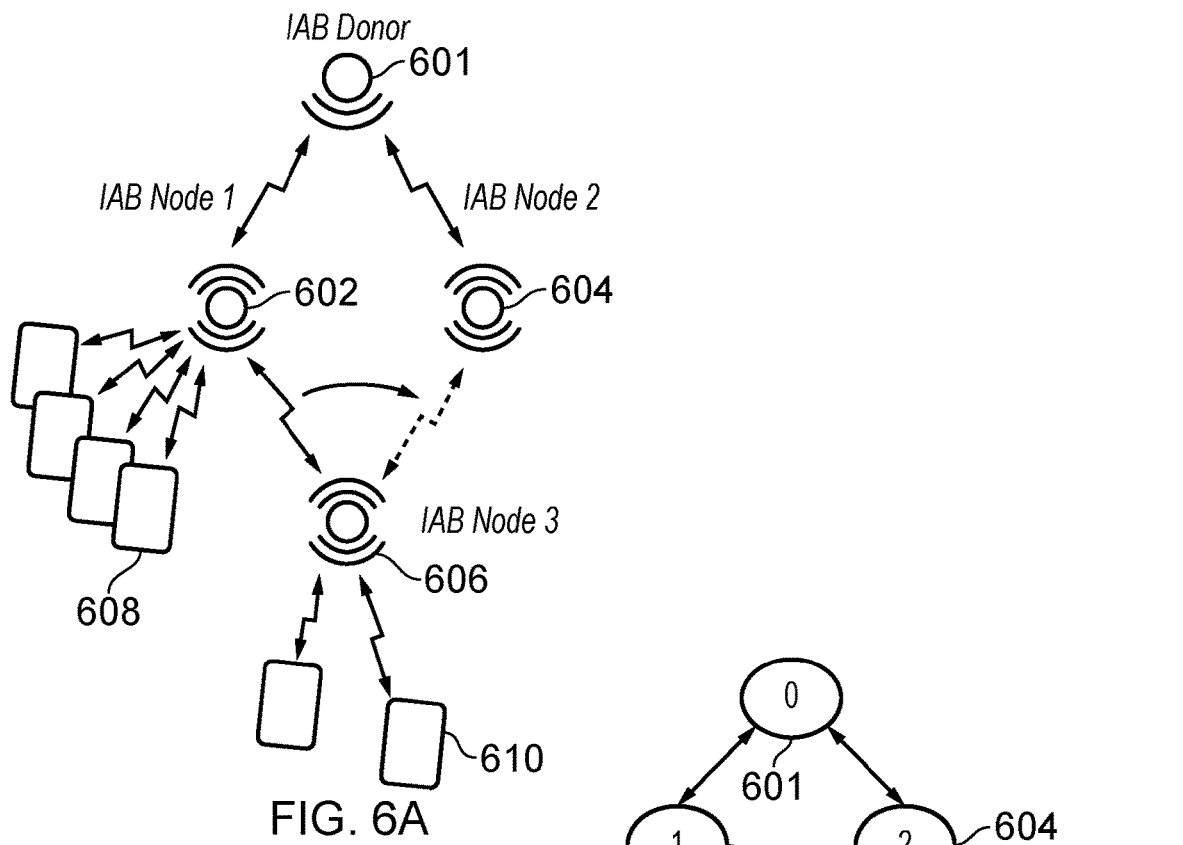
FIG. 6A is reproduced from [5], and provides a second example of an IAB deployment scenario in which there are multiple candidate routes each comprising multiple hops from the end node to the donor node.

FIG. 6A is reproduced from [5], and shows an example of a wireless communications system comprising a plurality of IAB-enabled nodes, which may for example be TRPs forming part of an NR network. These comprise an IAB donor node 601 which has a connection to the core network, two IAB nodes (a first IAB node 602 and a second IAB node 604) which have backhaul connections to the IAB donor node 601, and a third IAB node 606 (or end IAB node) which has a backhaul connection to each of the first IAB node 602 and the second IAB node 604. Each of the first IAB node 601 and third IAB node 606 has wireless access connections to UEs 608 and 610 respectively. As shown in FIG. 6A, originally the third IAB node 606 may communicate with the IAB donor node 601 via the first IAB node 602. After the second IAB node 604 emerges, there are now two candidate routes from the third IAB node 606 to the IAB donor node 601; via the first IAB node 602 and via the new second IAB node 604. The new candidate route via the second IAB node 604 will play an important role when there is a blockage in the first IAB node 602 to IAB donor node 604 links Hence, knowing how to manage the candidate routes efficiently and effectively is important to ensure timely data transmission between relay nodes, especially when considering the characteristics of wireless links.

In the case that the link between the first IAB node 602 and the third IAB node 606 is deteriorating, or the first IAB node 602 becomes overloaded, one of the nodes in the system (this could be the donor node 601 or the first IAB node 602 itself) will need to make a decision to change the route from the third IAB node 606 to the IAB donor node 601 from that via the first IAB node 602 to that via the second IAB node 604.

In FIG. 6A, only the IAB Donor gNB 601 has a fixed line backhaul into the core network. It should be assumed in this case that the traffic from all the UEs 610 within the third IAB node's 606 coverage is backhauled firstly to the first IAB node 602. This backhaul link must compete for capacity on the component carrier serving the first IAB Node 602 with all the UEs 608 within the coverage area of the first IAB Node 602. In the relevant art, the first IAB Node 602 in such a system as that of FIG. 6A is called a "hop"—it relays communications between the end (third) IAB node 606 and the donor IAB node 601. The backhaul link to the first IAB Node 602 requires enough capacity to support the traffic from all the UEs 610, bearing in mind that some of these may have stringent quality of service (QoS) requirements that translate into high traffic intensities.

Figure 6B:
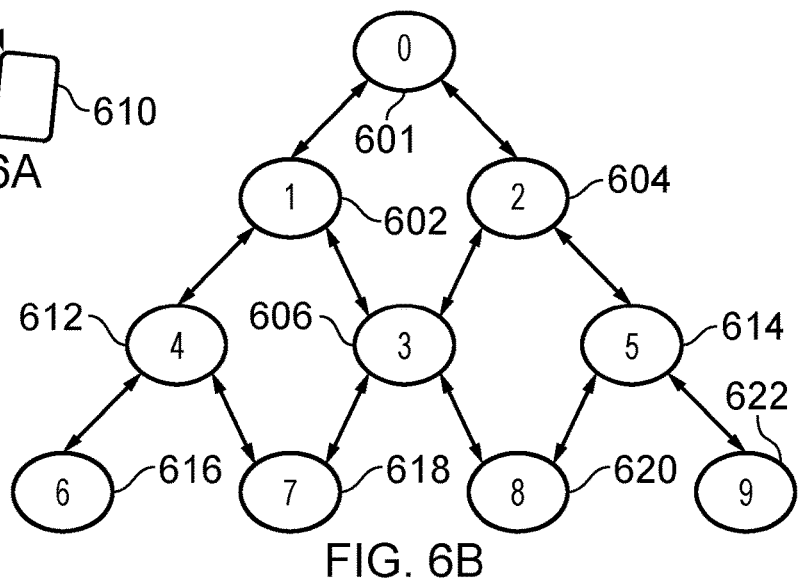
FIG. 6B is an extended version of FIG. 6A, providing a third example of an IAB deployment scenario in which there are multiple candidate routes each comprising multiple hops from the end node to the donor node.

FIG. 6B is an extended version of FIG. 6A, and shows what happens when there are multiple layers of IAB nodes in the deployment scenario. In the example of FIG. 6A, the third IAB node 606 is the child node of the first IAB node 602, and the first IAB node 602 may be the parent node of the third IAB node 606. However, a parent node may not necessarily be the next node up (i.e. one hop in the uplink direction) towards the IAB donor node 601. A parent node may be more than one hop away from its child node or children nodes, and is in a general sense configured to allocate uplink communications resources to the child node. For example, the donor IAB node 601 may in fact be the parent node of the third IAB node 606. This is shown with greater clarity in FIG. 6B.

In FIG. 6B, in addition to IAB node 601, 602, 604 and 606 as shown in FIG. 6A, there are additional IAB nodes 612 and 614 at the same layer or level of the network as IAB node 606. Below these are IAB nodes 616, 618, 620 and 622, which are now end nodes, in that they have no downlink backhaul connections to other IAB nodes. Here, it could be that the first IAB node 602 is still the parent of the third IAB node 606, but may also be the parent of IAB node 612. Further, the first IAB node 602 may be the parent of IAB nodes 616, 618 and 620 too, or may be a grandparent node to these nodes if nodes 606 and 612 are their parents. Furthermore, some child nodes may have multiple parent nodes, and can select from between them when transmitted uplink data in dependence on certain criteria, such as relative link qualities between the child node and its multiple parent nodes, or a relative load status between the parent nodes, for example.

Various architectures have been proposed in order to provide the IAB functionality. The below described embodiments of the present technique are not restricted to a particular architecture. However, a number of candidate architectures which have been considered in, for example, 3GPP document [6] are described below.

Figure 7:
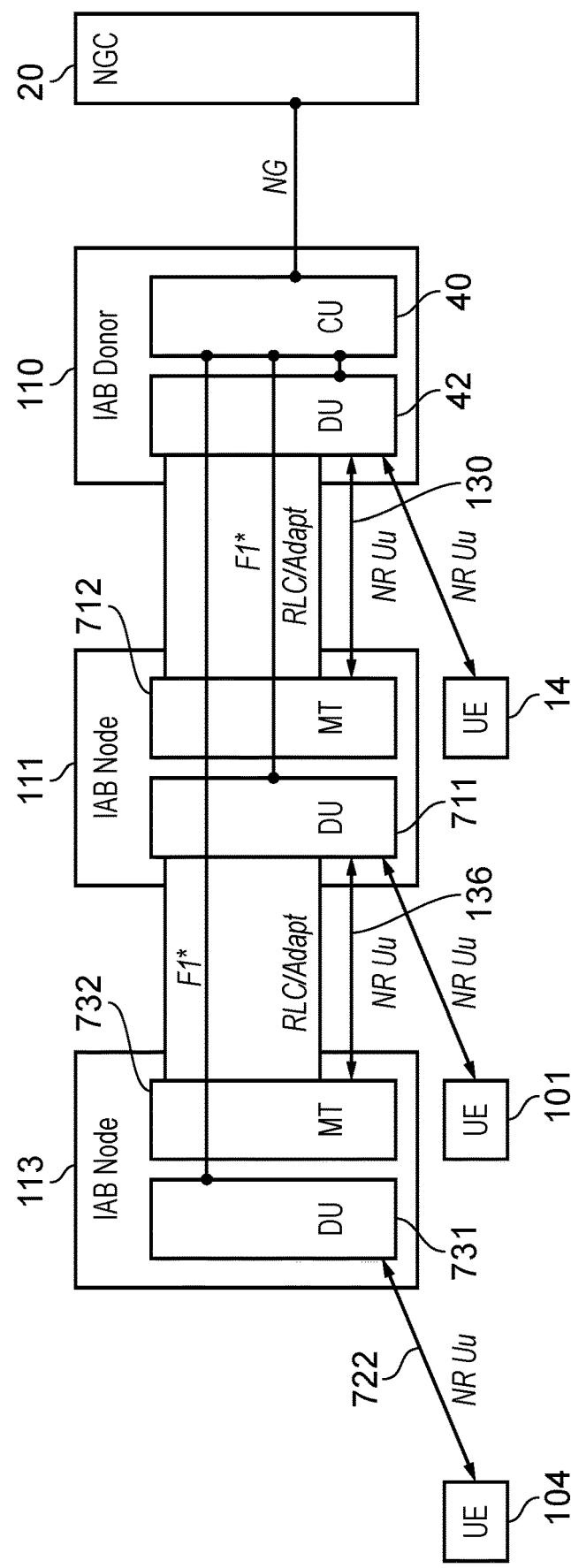
FIG. 7 is a block diagram illustrating a first possible network architecture for providing a wireless backhaul by means of IAB in a wireless telecommunication network which may be configured to operate in accordance with certain embodiments of the present disclosure.

FIG. 7 illustrates one possible architecture, sometimes referred to as "Architecture 1a", by which the donor Node 110, the Node 1 111 and the Node 3 113 may provide a wireless backhaul to provide connectivity for the UEs 104, 101, 14.

In FIG. 7, each of the infrastructure equipment acting as an IAB node 111, 113 and the donor node 110, includes a distributed unit (DU) 711, 731, 42 which communicates with the UEs 14, 101, 104 and (in the case of the DUs 42, 711 associated with the donor node 110 and the Node 1 111) with the respective downstream IAB nodes 111, 113. Each of the IAB nodes 111, 113 (not including the donor node 110) includes a mobile terminal (MT) 712, 732, which includes a transmitter and receiver (not shown) for transmitting and receiving data to and from the DU of an upstream IAB node and an associated controller (not shown). The inter-node wireless communications links 130, 136 may be in the form of new radio (NR) "Uu" wireless interface. The mobile terminals 712, 732 may have substantially the same functionality as a UE, at least at the access stratum (AS) layer. Notably, however, an MT may not have an associated subscriber identity module (SIM) application; a UE may be conventionally considered to be the combination of an MT and a SIM application.

The Uu wireless interfaces used by IAB nodes to communicate with each other may also be used by UEs to transmit and receive data to and from the DU of the upstream IAB node. For example, the Uu interface 130 which is used by the Node 1 111 for communication with the donor node 110 may also be used by the UE 14 to transmit and receive data to and from the donor node 110.

Similarly, an end node (such as the Node 3 113) may provide a Uu wireless interface 722 for the fourth UE 104 to communicate with the DU 731 of the Node 3 113.

Alternative candidate architectures for the provision of IAB are provided in FIG. 8 and FIG. 9, sometimes referred to as "Architectures 2a and 2b" respectively. In both FIG. 8 and FIG. 9, each IAB node includes a gNB function, providing a wireless access interface for the use of downstream IAB nodes and wireless communications devices. It should be appreciated that, although not shown in FIGS. 8 and 9, the gNB of each IAB donor 110 comprises a CU and a DU.

FIG. 9 differs from FIG. 8 in that, in FIG. 8, PDU sessions are connected end-on-end to form the wireless backhaul; in FIG. 9, PDU sessions are encapsulated so that each IAB node may establish an end-to-end PDU session which terminates at the IAB donor node 110.

Enhancements to IAB for NR

According to example IAB networks described above, an IAB network can be established between communications nodes which include a donor communications node which is connected to a core network. There are various enhancements to IAB networks which can be considered. One of those enhancements is a change in the topology as a result of a communications node migrating from one position within the network to another position within the network. Example embodiments described below relate to the situation in which a communications node migrates from one position in a backhaul network to another position in the backhaul network. As such a technical challenge is to provide techniques to reduce service interruption time caused by IAB-node migration and backhaul radio link failure (RLF) recovery to improve network performance and allow network deployments to undergo more frequent topology changes as well as to provide stable backhaul performance.

As mentioned above, inter-donor IAB node migration may impose an increased signalling overhead and/or a longer interruption time compared with intra-donor IAB node migration. This is because each donor IAB node is providing the communications resources for the radio links of the nodes connecting through it to the core network.

Consequently, it may be desirable to influence intra-donor IAB node migration over inter-donor IAB node migration. In some scenarios, as outlined below, it may be preferable to prioritise inter-donor IAB node migration over intra-donor IAB node migration.

Embodiments of the present technique can provide methods of controlling/selecting between intra- and inter-donor IAB node migration along with the relevant signalling procedures.

Inter-donor IAB node migration or intra-donor IAB node migration may be triggered for a range of reasons including one or more of the following:

Radio Link Failure (RLF)
Topology Update
Route change: (for example, the addition/removal of an IAB node in an IAB network)—
Mobility (for example, a change in mobility of an IAB node in an IAB network from high mobility to low mobility or vice versa)

Example embodiments can provide an arrangement for controlling inter-donor IAB node migration and/or intra-donor IAB node migration in an IAB network, which can improve an efficiency in which the network is organised and data is communicated. As explained above, a donor IAB node is an infrastructure equipment with a physical interface to a core network and provides radio communications resources to one or more other IAB nodes. The IAB nodes may be infrastructure equipment provided with a wireless backhaul connection or communications device acting as relay nodes for other communications devices. An intra-donor IAB node migration occurs when one IAB node changes a backhaul connection whilst data from that node is routed to and from the same donor node. In contrast an inter-donor IAB node migration occurs when IAB node changes a backhaul connection which results in data being routed to or received from a different donor IAB node.

Figure 10:
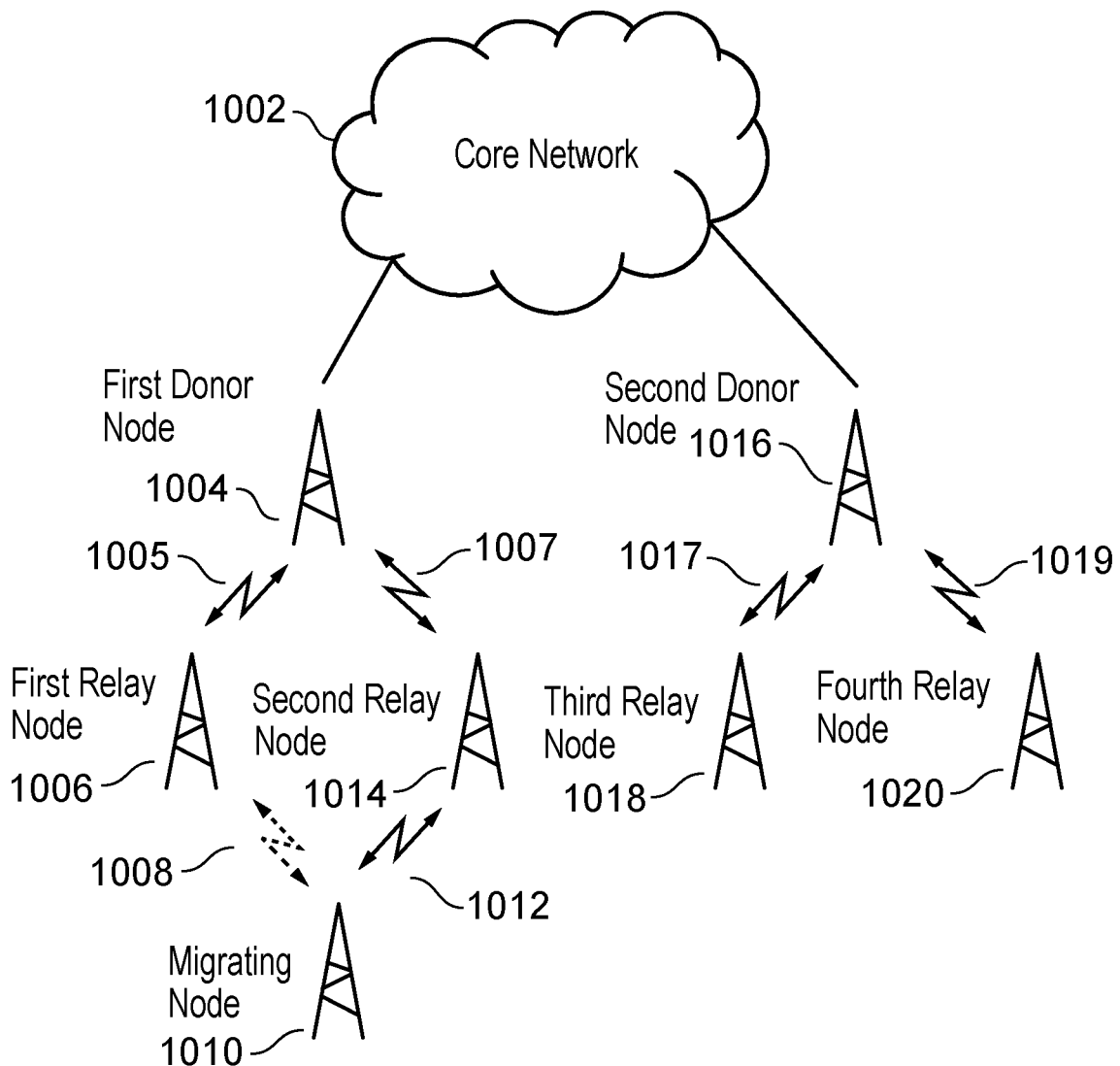
FIG. 10 is a schematic diagram illustrating an example of intra-donor migration in accordance with some embodiments of the present disclosure.

FIG. 10 illustrates an example of intra-donor IAB node migration in accordance with some embodiments. FIG. 10 illustrates a first IAB donor node 1004, a second IAB donor node 1016, a first IAB relay node 1006, a second IAB relay node 1014, a third IAB relay node 1018, a fourth IAB relay node 1020, an end node 1010, and a core network 1002. It will be appreciated that one or more of the IAB nodes in FIG. 10 may provide service to one or more UEs, although no UEs are shown in FIG. 10 for clarity.

The first 1004 and second 1016 IAB donor nodes are each connected to the core network 1002 by physical connections. As illustrated in FIG. 10, the first IAB donor node 1004 is connected to the first IAB relay node 1006 and the second IAB relay node 1014 via backhaul links 1005, 1007. Similarly, the second IAB donor node 1016 is connected to the third IAB relay node 1018 and the fourth IAB relay node via backhaul links 1017, 1019.

As explained above, an example of intra-IAB node migration is where an IAB node in an IAB network migrates from an attachment point which connects to the core network via one IAB donor node to attach at a different point which routes data to and from the core network via the same IAB donor node.

As an example illustrated in FIG. 10, initially, the end IAB node 1010 is connected to the second IAB relay node 1014 via a backhaul link 1012. In an example of intra-donor migration, the backhaul link 1012 may fail and the end IAB node 1010 may form a new connection with the first IAB relay node 1006 via a backhaul link 1008. It will be appreciated that intra donor-migration is any migration of an IAB node such that the route from the IAB node back to the core network is via the same donor IAB node. In an alternative example of intra-donor migration (not shown), the connection between the first IAB relay node 1006 and the first IAB donor node 1004 may fail and the first relay IAB 1006 node may form a new connection (via a backhaul link) with the second IAB relay node 1014.

Figure 11:
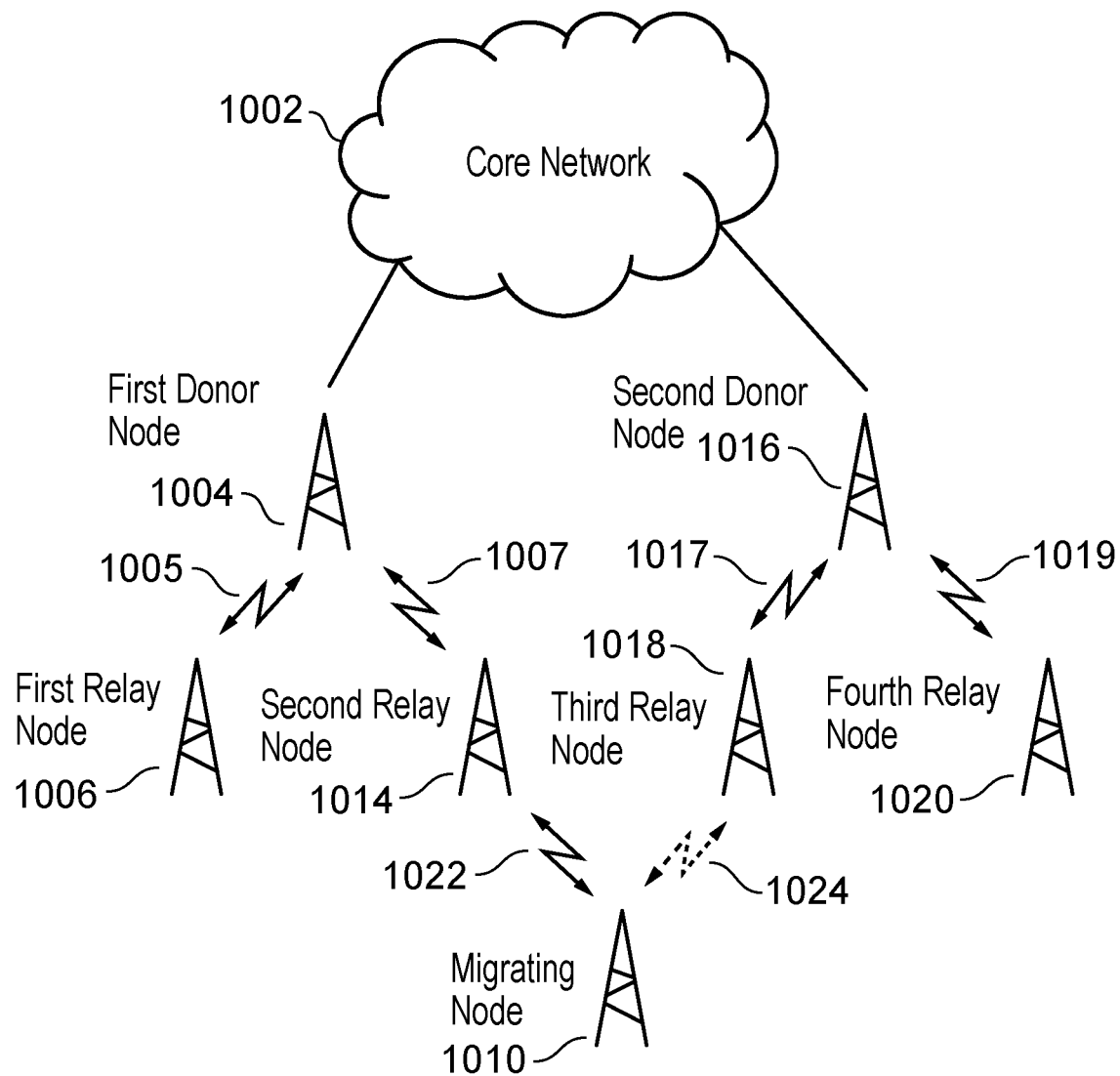
FIG. 11 is a schematic diagram illustrating an example of inter-donor migration in accordance with some embodiments of the present disclosure.

In contrast FIG. 11 illustrates an example of inter-donor IAB node migration in accordance with some embodiments. As explained above, inter-IAB node migration is where an IAB node in an IAB network migrates from an attachment point which connects to the core network via one IAB donor node to attach at a different point which routes data to and from the core network via the different IAB donor node. FIG. 11 is largely based on FIG. 10 and the same reference numerals will be used for corresponding features. Initially, the end IAB node 1010 is connected to the second IAB relay node 1014 via a backhaul link 1022. In an example of inter-donor migration, the backhaul link 1022 may fail and the end IAB node 1010 may form a new connection with the third IAB relay node 1018 via a backhaul link 1024.

In the examples shown in FIGS. 10 and 11, the end IAB node 1010 is an example of a "migrating node".

It will be appreciated that inter donor migration is any migration of an IAB node such that the route from the IAB node back to the core network is via a different donor IAB node. In an alternative example of inter-donor migration (not shown in the Figures), the connection between the second IAB relay node 1014 and the first IAB donor node 1004 may fail. In this example, the second relay node 1014 may act as a migrating node and form a connection (via a backhaul link) with the third IAB relay node 1018, the second IAB donor node 1016 or the fourth IAB relay node 1020.

Inter-Donor Migration Cost Factor

During a route selection procedure, potential routes for the transmission of data between an IAB node and a core network are determined. For each of the potential routes, the IAB node may calculate a cost factor. The cost factor is an indication of the desirability of the route for transmission of data from the IAB node to the core network. For example, a higher cost factor may indicate that a particular route is less desirable for the transmission of data to the core network. The IAB node may use a route with the lowest cost factor to transmit data to the core network. The decision of which potential route to use to transmit the data to the core network may be with a donor IAB node connecting (either directly or indirectly) the IAB node to the core network.

Various elements are included in the calculation of the cost factor for each route during the route selection procedure. Examples include, but are not limited to, a delay on a route and throughput on a route. In some embodiments, an indication of whether or not potential routes require an inter-donor migration (such as that shown FIG. 11) may be included in the cost-factor. For example, in a case in which is not desirable for an inter-donor migration to occur, a greater cost factor may be assigned to routes involving inter-node migration. This may be achieved by assigning a larger coefficient to the indication that the route involves an inter-donor migration in the cost factor as compared with other elements in the cost factor such as delay on a route. In this example, routes for the transmission of data from the IAB node to the core network involving an inter-donor migration are therefore discouraged.

In other embodiments, indication of whether or not a route involves an inter-donor migration in the cost factor may only be included (or be assigned a higher weight/coefficient) in the cost factor during a route selection procedure with particular requirements. For example, for delay sensitive services (for example, services with a stringent QoS requirement), it may be important to include inter-donor migration in the cost factor because inter-donor migration is likely to lead to a significant delay.

An example of using the cost factor to determine a path will now be explained. As explained above, in some arrangements of embodiments of the present technique, it is proposed that an indication of whether a route would require an inter-donor migration or an intra-donor migration is included in a cost factor used to select a route for data transmission to the core network. In some embodiments (such as the examples shown in FIGS. 12 and 13), the cost factor may be a hypothetical path cost value based on the link capacity/bandwidth between IAB nodes or along routes. In this embodiment, the relative weighting of links in the routes may be altered by whether the route involves an inter-node migration or an intra-node migration. In some embodiments, the IAB donor node calculates a value of the path cost and distributes it to each IAB node in the network afterwards.

For example, assuming the following cost table reproduced from [7]:

TABLE I

Path cost calculation of IEEE 802.1D-1998 Spanning Tree Protocol (SPT).

| Link capacity | Cost |
|---|---|
| 10 Gbps | 2 |
| 1 Gbps | 4 |
| 100 Mbps | 19 |
| 10 Mbps | 100 |

In the conventional SPT, the path cost is simply defined based on link capacity, because the bandwidth is constant in a fixed line. On the other hand, the IAB link cost cannot be defined by a straightforward definition. It could be variable and dynamically changed. For example, the link (channel) quality may have an impact on it, or the load of a node's processing may have an impact on it. There may be predefined preferences; for example, a node may have a good directional antenna. Therefore, the path cost, in the context of IAB networks, is no longer simply a one-to-one mapping of link capacity. The cost calculation may need to take multiple factors into account. For example, these factors may include the sum of link capacity, stability of channel quality, and the room of processing load at each node, etc. In accordance with some embodiments, an indication of whether paths would require an inter-node migration or an intra-node migration is included in the path cost calculation.

Figure 12:
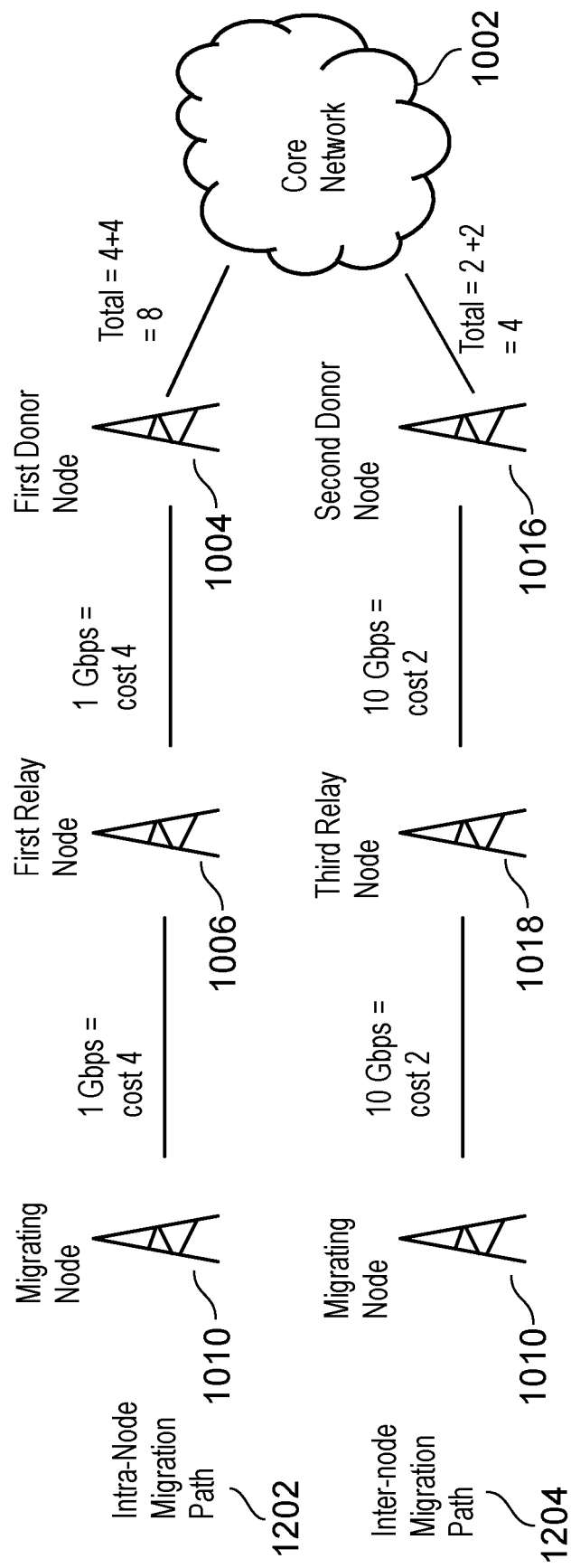
FIG. 12 illustrates a calculation of a path cost factor for candidate routes involving intra-node migration and inter-node migration according to some embodiments.

FIG. 12 shows an example of path cost calculation which does not include an indication of whether the paths require an inter-node migration or intra-node migration. This calculation comprises simply cumulating the sum of each link cost for clarity, although it will be appreciated that each link could be given a different weighting depending on any of the factors mentioned above. In both cases shown in FIG. 12, the migrating node is assumed to have been originally performing radio communication with the first donor node via the second relay node (as in FIGS. 10 and 11). During re-establishment to the core network, two candidate routes are shown in FIG. 12: an intra-node migration path and an inter-node migration path Taking the sum of each link cost to calculate the path cost value:

$$\text{cost}=4+4=8 \quad \text{Intra-Node Migration Path;}$$

$$\text{cost}=2+2=4 \quad \text{Inter-Node Migration Path;}$$

In the conventional calculation example then as shown by FIG. 12, the cost of Intra-Node Migration path is higher than that of the inter-node migration path. The superior value is evidently the value among the candidate routes that is smaller. In this example, the superior value is the path cost of the inter-node migration path, which would then be selected. Of course, when other communications criterion to path cost are used, the "superior" value could be the smallest value (e.g. for current load or traffic at an IAB parent node) or it could be the largest value (e.g. for link quality between the child node and candidate IAB parent nodes).

In the context of IAB, there is room to improve for the above path cost calculation. For example, it may be desirable to increase the cost of links which would require an inter-node migration because of a high quality of service requirement.

Figure 13:
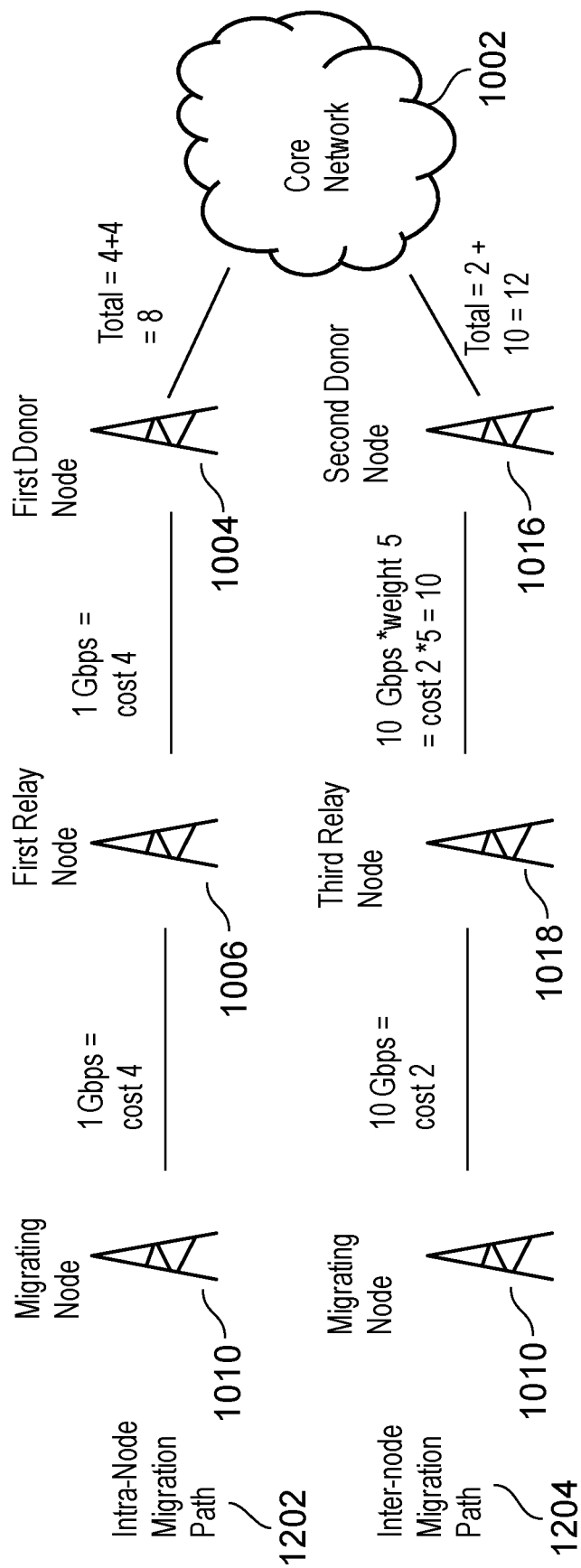
FIG. 13 illustrates a calculation of a path cost factor for candidate routes involving intra-node migration and inter-node migration according to some embodiments.

FIG. 13 shows an example of weighted path cost calculation which takes into account whether the path involves an inter-node migration or an intra-node migration. For example, the link closer to between the third relay node and the second donor node is given a weighting of 5 because this path would involve a change of donor node (recalling that the migrating node is originally connected to the first donor node). As in the conventional path cost calculation example of FIG. 12, there are two routes shown in FIG. 13 to reach the core network these are the intra-node migration path and the inter-node migration path. Taking the sum of each weighted link cost to calculate the path cost value:

$$\text{cost}=4+4=8 \quad \text{Intra-Node Migration Path;}$$

$$\text{cost}=2+5*2=12 \quad \text{Inter-Node Migration Path;}$$

As a result, unlike the example shown in FIG. 12, the superior value is the path cost of the Intra-Donor Migration path rather than the Inter-Donor Migration path because a change in donor node is deemed more important than link capacity and thus weighted heavily. Therefore, the intra-donor migration path is selected.

The nodes report the link capacity (quality) and the processing load to the network. Then, the network decides the weight of each link. The network may broadcast the link cost and its weight. Alternatively, each node may calculate the cost weight based on its own measurement and report this to the network.

As another example, as part of the inter-node migration path, if the migrating node is connected directly to the second donor infrastructure equipment via a backhaul link, the total cost of this path might be 10 (for example if the link capacity between the migrating node and the second donor equipment is 10 Gbps=cost 2 and a weighting factor is 5 to account for a change in donor). In this example, it can be seen that intra-node migration is preferably chosen over inter-node migration despite the inter-node migration path involving fewer hops to reach the core network.

It will be appreciated that the path cost for the inter-node migration path may be increased to preferentially select the intra-node migration path in a variety of different ways in addition to weighting the path cost. For example, an inter-node migration cost may be explicitly introduced into the cost factor as explained above. Following the example in FIG. 12, the cost of the intra node migration path is 8 whereas the cost of the inter-node migration path is 4. However, an inter-node migration cost of 6, for example, would increase the inter-node migration path cost to 10 so that it is higher than the cost of the intra-node migration path cost, and the intra-node migration path is preferentially selected.

In some embodiments, an IAB node may serve a plurality of UEs with different QoS requirements. Each QoS requirement may require a different RLC channel. If a route change is required for an IAB node serving different QoS requirements via the different RLC channels, then the higher QoS requirements may be used in combination with the cost factor to determine the route or data transmission in the route section procedure.

Indicator in Routing Table

Generally, in both known systems and in embodiments of the present technique, most of a route selection procedure between nodes in a multi-hop system can be based either on a centralised manner or a distributed manner. In a centralised scheme, there will be a central IAB node (which may be a donor IAB node) which will decide the route between nodes and may need to distribute this route information to each node. However, in a distributed scheme, each node will decide the route according to its local information in a distributed manner. In other words, in a centralised scheme, a central unit connected to a core network may determine which path to select for data transmission between the migrating IAB node the core network. In a distributed scheme, the migrating IAB node may determine which path to select for data transmission between the migrating IAB node and the core network.

FIG. 14 illustrates an example of including an indication of whether routes in a routing table would involve an inter-node or intra-node migration. The routes correspond to routes between the migrating IAB node and the core network. The routing table may be maintained by a central IAB node in a centralised scheme or maintained by the migrating node in a distributed scheme. The table in FIG. 4 is based on the scenario in FIG. 12 where an indication of whether a route would involve an intra-node or inter-node migration is not included in the cost factor. In the example, even though the routing table may indicate that a route cost for the inter-node migration path is lower, the indication that the route would involve a change in donor may be used to preferentially select the intra-node migration path. In this embodiment, the migrating IAB node is used to preferentially select the intra-node migration path in the distributed scheme in which the migrating IAB node received the routing table from the central IAB node. Alternatively, the central IAB node is used to preferentially select the intra-node migration path in the centralised scheme in which the central IAB node maintains the routing table. Other indicators, along with the indication of whether each route would involve an intra-node or inter-node migration, may be included in the table. These indicators may include at least one or more of: a link quality, link capacity or other QoS parameters such as latency and bit rate. If the data to be transmitted is a relatively small amount of data, then the node can select a non-optimal route to transmit it on, as long as there are no QoS requirements that this route would fail to satisfy. The routing table additionally includes an indication of possible routes from the migrating IAB node to a core network for data transmission.

In some embodiments, the indication of whether or not each route would involve an inter-node or intra-node migration may be included in the routing table when a central unit (CU) connected to the central IAB node configures the routing table.

In some embodiments, indications of additional route factors may be included in the routing table along with the indication of whether a route requires an inter-donor migration. For example, an indication of a link capacity required for each route may be included in the routing table.

In a distributed scheme, the migrating IAB node may receive the routing table from the CU. In this embodiment, the migrating IAB node determines which path to select for data transmission between the migrating IAB node and the core network on a basis of one or more of the indicators included in the routing table.

In a centralised scheme, the CU may determine which path to select for data transmission between the migrating node and the core network on a basis of one or more of the indicators included in the routing table.

In other embodiments, the migrating IAB node may send an inter-donor migration request to the CU to request whether or not a particular route would require an inter-donor migration. In this embodiment, the migrating node determines which path to select for data transmission between the migrating node and the core network on a basis of one or more of the indicators included in the routing table.

Zone Area Indicator

In some embodiments, one or more child IAB nodes may be connected to a donor IAB node (either directly or indirectly) via one or more backhaul link(s). The donor IAB node may send a donor IAB node indicator to each of the one or more child IAB nodes including an indication of which donor IAB node is serving that child IAB node. The donor IAB node indicator may include an identification of a DU and/or CU of the donor IAB node. The one or more child IAB nodes may broadcast this indication in a system information block (SIB) to other IAB nodes. In other embodiments, the one or more child IAB nodes may transmit the donor IAB indicator to specific IAB nodes via dedicated signalling (for example, the IAB node may send the donor IAB indicator to other child IAB nodes which are served by the same donor IAB node). Consequently, child IAB nodes of a particular donor IAB node may be aware that they are served by the same donor IAB node. The child IAB nodes may select candidate routes on which to transmit data packets based on this information. For example, for services with a stringent QoS requirement, the child IAB node may choose to exclude routes for data transmission which would require an inter-donor migration.

In some embodiments, the donor IAB node may include an indication of one or more service requirements in the donor indicator. The one or more service requirements may include constraints imposed on data transmission from a child IAB node to the donor IAB node to guarantee a quality of service for the data transmission. For example, the one or more service requirements may include an indication of an allowed bitrate, latency, and type of application for the data transmission. In this embodiment, the child IAB node may use the indication of the one or more service requirements included in the donor indicator to exclude routes which would require an inter-donor migration for data transmission. For example, the child node may determine that a cost factor for an inter-node migration path has a lower cost factor than an intra-node migration path. In this case, the child IAB node may use the indication of the one or more service requirements included in the donor indicator to exclude the inter-node migration path for data transmission even though it has a lower cost factor than the intra-node migration path in this example. The one or more service requirements may indicate that, despite having a lower cost factor, the inter-node migration path does not satisfy one or more of the service requirements. For example, if link capacity is not included in the calculation of the cost factor (or is given a low weighting relative to other factors included in the calculation), the inter-donor migration path may have the lowest cost even if it has a relatively high link capacity. However, the one or more service requirements may indicate an allowed limit on the link capacity and, if the inter-donor migration path link capacity exceeds this, then the path is excluded from consideration for data transmission.

In some embodiments, one or more donor IAB nodes may transmit the same donor IAB indicator. In this embodiment, the donor indicator may include an indication of a potential cost of inter-donor migration between two different donor IAB nodes in the wireless backhaul network.

In some embodiments, a donor IAB node may have one or more zone areas. In some embodiments, the one or more zone areas are defined for different services. For example, the one or more zone areas may be areas within which a child IAB node of the donor IAB node may move freely and/or offload traffic and still meet a service requirement for a service. For example, a zone area may be an area within which the child IAB node can meet a latency requirement to the core network for the service. Therefore if a child IAB node remains within the zone area, it may not be necessary to consider inter-donor migration paths because it can still meet the requirements of the service while it is in the zone area. Each zone area may have a zone area indicator. The zone area indicator may include an indication of one or more service requirements for the zone area. The zone area indicator may be transmitted from the donor IAB node to the child IAB node. For example, the zone area indicator may indicate the zone area to which the child IAB node belongs. The child IAB node may broadcast the zone area indicator to other IAB nodes or transmit the zone area indicator via dedicated signalling.

Radio Link Failure (RLF) and Mobility

In some embodiments, an IAB node may declare a radio link failure (RLF) on a backhaul link in an IAB network. Therefore, the IAB node which declared RLF may have lost connection to a donor IAB node serving it. In alternative embodiments, the IAB node may have lost connection to the donor IAB node serving it because of a change in mobility. The IAB node which declared RLF may seek to re-establish connection to the IAB network. In some embodiments, during re-establishment, it may be desirable to prioritise connection to either the donor IAB node which originally served the IAB node which declared RLF, or a child node of the donor IAB node which originally served the IAB node which declared RLF (intra-donor re-establishment). The intra-donor re-establishment may be prioritised over a connection to a different donor IAB node or a child node of the different IAB node (inter-donor re-establishment). In an example, the prioritisation may be achieved by only sending RRC re-establishment request messages to the donor IAB node originally serving the IAB node which declared RLF or one of the child nodes of the donor IAB node originally serving the IAB node which declared RLF.

In some embodiments, a CU may indicate to the IAB node which declared RLF whether or not intra-donor re-establishment is of a higher priority than intra-donor re-establishment.

In some embodiments, additional factors are taken into consideration during the re-establishment procedure. For example, an inter-donor re-establishment may result in a high MT coverage area. The advantages of having a high MT coverage area may be more important than the disadvantages of inter-donor re-establishment. In this scenario, inter-donor re-establishment may occur even if intra-donor re-establishment was possible.

It will be appreciated that the embodiments disclosed herein are applicable to a cases in which: a first UE is connected to a second UE via a PC-5 interface and the second UE hands over to a third UE via another PC-5 interface. In this example, intra-donor migration occurs if the first UE is connected to a first base station and the third UE is also connected to the first base station (by a Uu interface, for example). In this example, inter-donor migration occurs if the first UE is connected to a first base station and the third UE is also connected to a second base station (by a Uu interface, for example).

Figure 15:
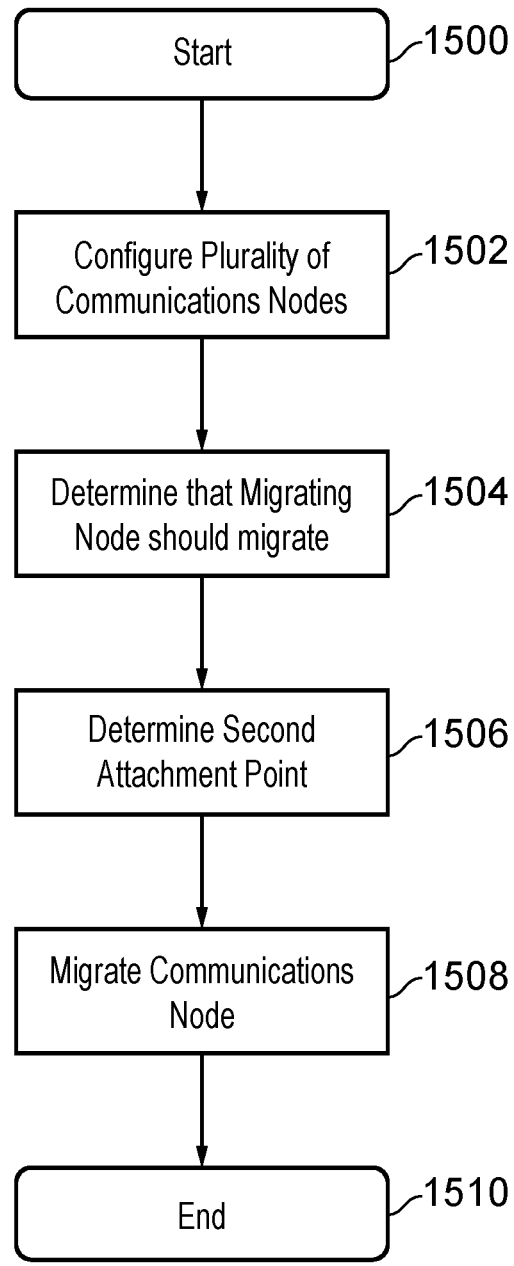
FIG. 15 is a flow diagram illustrating a method of communications in a wireless communications network according to some embodiments.

FIG. 15 is a flow diagram illustrating a method of communicating in a wireless communications network according to some embodiments. The method begins at a start point 1500. In step 1502, a plurality of communications nodes are configured to form a wireless backhaul network to communicate data from a core network of the wireless communications network for transmitting to one or more communications devices or to communicate data to the core network received from the one or more communications devices, at least a first and a second of the plurality of communications nodes being donor communications nodes formed from radio network infrastructure equipment having a physical connection to the core network. In some embodiments, the one or more communications devices may be one or more User Equipment (UEs).

In step 1504, a migrating communications node or a first donor communications node determines that the migrating node should migrate from a first attachment point in the wireless backhaul network in which the migrating node communicates the data to or from the core network via the first donor communications node. The term "attachment point" is used to express a link of a communications node to other nodes in the backhaul network. The migrating communications node may be infrastructure equipment or a user equipment. The first attachment point may be a connection (such as a backhaul link) between the migrating communications node and the first donor communications node. Alternatively, the first attachment point may be a connection (such as a backhaul link) between the migrating communications node and a child node of the first donor communications node. Therefore, the radio communications links are formed to communicate data to and from the core network via donor communications nodes and may be also via one or other nodes according to an established hierarchy of the wireless backhaul network.

In step 1506, the migrating communications node or the first donor communications node determines a second attachment point in the wireless backhaul network to which the migrating communications node should attach to the wireless backhaul network to communicate the data to or from the core network. The second attachment point may be a connection (such as a backhaul link) between the migrating communications node and the second donor communications node. Alternatively, the second attachment point may be a connection (such as a backhaul link) between the migrating communications node and a child node of the second donor communications node. Therefore, the radio communications links are formed to communicate data to and from the core network via donor communications nodes and may be also via one or other nodes according to an established hierarchy of the wireless backhaul network. It may be determined that a second attachment point is required because of one or more of a radio link failure (RLF), a topology update, a change in a route for communicating the data between the migrating node and the core network and a change in a mobility status of the migrating node.

The determining of the second attachment point may include selecting a route from a plurality of candidate routes or communicating the data between the migrating communications node and the core network based on a route cost calculated for each of the plurality of candidate routes. The determining the second attachment point includes biasing a selection of the second attachment point either to provide the migrating communications node with radio communications resources from the first donor communications nodes when attached to the wireless backhaul network at the second attachment point as an intra-donor migration, or to provide the migrating communications node with radio communications resources from the second donor communications node when attached to the wireless backhaul network at the second attachment point as an inter-donor migration. In some embodiments, an inter-node migration and an intra-node migration cost may be included in the calculation of the route cost. In some embodiments, an indication of whether a route in a routing table would require an inter-donor migration or intra-donor migration is included in the routing table. The migrating node may determine the second attachment point on a basis of the routing table in a distributed scheme. The first donor node may determine the second attachment on a basis of the routing table in a centralised scheme.

In step 1508, the migrating communications node migrates from the first attachment point to the second attachment point. This migration may occur as a result of an instruction to migrate received from the first donor communications node if the first donor communications node. The process ends at step 1510.

The following numbered paragraphs provide further example aspects and features of the present technique:

Paragraph 1. A method of communicating in a wireless communications network, the method comprising configuring a plurality of communications nodes to form a wireless backhaul network to communicate data from a core network of the wireless communications network for transmitting to one or more communications devices or to communicate data to the core network received from the one or more communications devices, at least a first and a second of the plurality of communications nodes being donor communications nodes formed from radio network infrastructure equipment having a physical connection to the core network, determining that a migrating communications node should migrate from a first attachment point in the wireless backhaul network in which the migrating node communicates the data to or from the core network via the first donor communications node, determining a second attachment point in the wireless backhaul network to which the migrating communications node should attach to the wireless backhaul network to communicate the data to or from the core network, and migrating the communications node from the first attachment point to the second attachment point, wherein the migrating communications node is provided with radio communications resources from the first donor communications node when attached to the wireless backhaul network at the first attachment point, and the determining the second attachment point includes biasing a selection of the second attachment point either
to provide the migrating communications node with radio communications resources from the first donor communications node when attached to the wireless backhaul network at the second attachment point as an intra-donor migration, or
to provide the migrating communications node with radio communications resources from the second donor communications node when attached to the wireless backhaul network at the second attachment point as an inter-donor migration.

Paragraph 2. A method according to paragraph 1, wherein the first attachment point comprises a radio communications link between the migrating communications node and one of the plurality of communications nodes other than the second donor communications node, the radio communications link providing wireless transmission of the data to the core network or wireless reception of the data from the core network.

Paragraph 3. A method according to any of paragraphs 1 or 2, wherein the second attachment point comprises a radio communications link between the migrating communications node and one of the plurality of communications nodes other than the first donor communications node, the radio communications link providing wireless transmission of the data to the core network or wireless reception of the data from the core network.

Paragraph 4. A method according to any of paragraphs 1 to 3, wherein the determining the second attachment point in the wireless backhaul network to which the migrating communications node should attach to the wireless backhaul network to communicate the data to or from the core network includes selecting a route from a plurality of candidate routes for communicating the data between the migrating communications node and the core network based on a route cost calculated for each of the plurality of candidate routes.

Paragraph 5. A method according to paragraph 4, wherein the route cost for each of the plurality of candidate routes includes at one or more of:
an estimated time for communicating the data between the migrating communications node and the core network;
an amount available radio resources available for communicating the data between the migrating communications node and the core network;
a number of hops required to communicate the data between the migrating communications node and the core network.

Paragraph 6. A method according to paragraph 4 or 5, wherein the biasing the selection of the second attachment point comprises
including an intra-node migration cost and an inter-node migration cost in the route cost for the plurality of candidate routes for communicating the data between the migrating communications node and the core network.

Paragraph 7. A method according to paragraph 6, wherein the biasing the selection of the second attachment point comprises
assigning a weight to the intra-node migration cost and the inter-node migration relative to the estimated time, the amount of radio resources available and the number of hops required for communicating the data between the migrating communications node and the core network.

Paragraph 8. A method according to paragraph 7, wherein the weight assigned to the inter-node migration cost is higher than the weight assigned to the intra-node migration cost in a case where the data communicated between the migrating communications node and the core network has a stringent quality of service, QoS, requirement.

Paragraph 9. A method according to any of paragraphs 1 to 3, wherein the determining the second attachment point in the wireless backhaul network to which the migrating communications node should attach to the wireless backhaul network to communicate the data to or from the core network includes
selecting a route of a plurality of candidate routes for communicating data between the migrating communications node and the core network based on an indication of whether each of the plurality of candidate routes involve an inter-donor migration or an intra-donor migration included in a routing table maintained at the first donor communications node or received from the first donor communications node by the migrating communications node via the first attachment point.

Paragraph 10. A method according to any of paragraphs 1 to 9, comprising
receiving by the migrating communications node, from the first donor communications node via the first attachment point, a donor indicator indicating that the migrating communications node is attached to the first donor node via the first attachment point.

Paragraph 11 A method according to paragraph 10, wherein the donor indicator includes an indication of one or more service requirements for communicating data between the migrating node and the core network.

Paragraph 12. A method according to paragraph 11, comprising
transmitting, by the migrating communications node, to one or more others of the plurality of communications nodes, the donor indicator received from the first donor communications node.

Paragraph 13. A method according to paragraph 1, wherein the determining that the migrating communications node should migrate from the first attachment point comprises detecting one or more of a radio link failure (RLF), a topology update, a change in a route for communicating the data between the migrating node and the core network and a change in a mobility status of the migrating node.

Paragraph 14. A method according to paragraph 13, wherein the biasing the selection of the second attachment point includes sending a re-establishment message to the first donor communications node from the migrating communications node.

Paragraph 15. A method according to any of paragraphs 1 to 14, wherein communications nodes of the plurality of communications nodes other than the first donor communications node and the second donor communications node are formed from either radio network infrastructure equipment of the wireless communications network or communications devices acting as relay nodes for the one or more communications devices and forming the wireless backhaul network using radio communications resources provided by the donor communications nodes.

Paragraph 16. A method according to any of paragraphs 1 to 15, wherein the migrating communications node is a communications device and the first and second attachment points correspond to sidelink interfaces.

Paragraph 17. A method according to any of paragraphs 1 to 15, wherein the migrating communications node is formed from radio network infrastructure equipment.

Paragraph 18. A method according to any of paragraphs 1 to 17, wherein the determining the second attachment point in the wireless backhaul network to which the migrating communications node should attach to the wireless backhaul network to communicate the data to or from the core network is performed by the first donor communications node.

Paragraph 19. A method according to any of paragraphs 1 to 17, wherein the determining the second attachment point in the wireless backhaul network to which the migrating communications node should attach to the wireless backhaul network to communicate the data to or from the core network is performed by the migrating communications node.

Paragraph 20. A method according to any of paragraphs 1 to 19, wherein the determining that a migrating communications node should migrate from a first attachment point in the wireless backhaul network in which the migrating node communicates the data to or from the core network via the first donor communications node is performed by the first donor communications node Paragraph 21. A method according to any of paragraphs 1 to 19, wherein the determining that a migrating communications node should migrate from a first attachment point in the wireless backhaul network in which the migrating node communicates the data to or from the core network via the first donor communications node is performed by the migrating communications node Paragraph 22. A migrating communications node of a plurality of communications nodes configured to form a wireless backhaul network in a wireless communications network, the plurality of communications nodes including at least a first and a second of the plurality of communications nodes being donor communications nodes formed from radio network infrastructure equipment having a physical connection to a core network of the wireless communications network, the migrating communications node comprising receiver circuitry configured to receive data from the core network or one or more communications devices;

transmitter circuitry configured to transmit data to the core network or the one or more communications devices;

controller circuitry configured to determine that the migrating communications node should migrate from a first attachment point in the wireless backhaul network in which the migrating node communicates the data to or from the core network via the first donor communications node, to determine a second attachment point in the wireless backhaul network to which the migrating communications node should attach to the wireless backhaul network to communicate the data to or from the core network, and to migrate from the first attachment point to the second attachment point, wherein the migrating communications node is provided with radio communications resources from the first donor communications node when attached to the wireless backhaul network at the first attachment point, and the determining the second attachment point includes biasing a selection of the second attachment point either to provide the migrating communications node with radio communications resources from the first donor communications node when attached to the wireless backhaul network at the second attachment point as an intra-donor migration, or to provide the migrating communications node with radio communications resources from the second donor communications node when attached to the wireless backhaul network at the second attachment point as an inter-donor migration.

Paragraph 23. A migrating communications node according to paragraph 22, wherein the first attachment point comprises a radio communications link between the migrating communications node and one of the plurality of communications nodes other than the second donor communications node, the radio communications link providing wireless transmission of the data to the core network or wireless reception of the data from the core network.

Paragraph 24. A migrating communications node according to any of paragraphs 22 or 23, wherein the second attachment point comprises a radio communications link between the migrating communications node and one of the plurality of communications nodes other than the first donor communications node, the radio communications link providing wireless transmission of the data to the core network or wireless reception of the data from the core network.

Paragraph 25. A migrating communications node according to any of paragraphs 22 to 24, wherein the determining the second attachment point in the wireless backhaul network to which the migrating communications node should attach to the wireless backhaul network to communicate the data to or from the core network includes selecting a route from a plurality of candidate routes for communicating the data between the migrating communications node and the core network based on a route cost calculated for each of the plurality of candidate routes.

Paragraph 26. A migrating communications node according to paragraph 25, wherein the route cost for each of the plurality of candidate routes includes at one or more of:

an estimated time for communicating the data between the migrating communications node and the core network;

an amount available radio resources available for communicating the data between the migrating communications node and the core network;

a number of hops required to communicate the data between the migrating communications node and the core network.

Paragraph 27. A migrating communications node according to paragraph 25 or 26, wherein the biasing the selection of the second attachment point comprises including an intra-node migration cost and an inter-node migration cost in the route cost for the plurality of candidate routes for communicating the data between the migrating communications node and the core network.

Paragraph 28. A migrating communications node according to paragraph 27, wherein the biasing the selection of the second attachment point comprises assigning a weight to the intra-node migration cost and the inter-node migration relative to the estimated time, the amount of radio resources available and the number of hops required for communicating the data between the migrating communications node and the core network.

Paragraph 29. A migrating communications node according to paragraph 28, wherein the weight assigned to the inter-node migration cost is higher than the weight assigned to the intra-node migration cost in a case where the data communicated between the migrating communications node and the core network has a stringent quality of service, QoS, requirement.

Paragraph 30. A migrating communications node according to any of paragraphs 22 to 25, wherein the determining the second attachment point in the wireless backhaul network to which the migrating communications node should attach to the wireless backhaul network to communicate the data to or from the core network includes selecting a route of a plurality of candidate routes for communicating data between the migrating communications node and the core network based on an indication of whether each of the plurality of candidate routes involve an inter-donor migration or an intra-donor migration included in a routing table received from the first donor node via the first attachment point.

Paragraph 31. A migrating communications node according to any of paragraphs 22 to 30, wherein the receiver circuitry is configured to receive, from the first donor communications node via the first attachment point, a donor indicator indicating that the migrating communications node is attached to the first donor node via the first attachment point.

Paragraph 32. A migrating communications node according to paragraph 31, wherein the donor indicator includes an indication of one or more service requirements for communicating data between the migrating node and the core network.

Paragraph 33. A migrating communications node according to paragraph 32, wherein the transmitter circuitry is configured to transmit, to one or more others of the plurality of communications nodes, the donor indicator received from the first donor communications node.

Paragraph 34. A migrating communications node according to paragraph 22, wherein the determining that the migrating communications node should migrate from the first attachment point comprises detecting one or more of a radio link failure (RLF), a topology update, a change in a route for communicating the data between the migrating node and the core network and a change in a mobility status of the migrating node.

Paragraph 35. A migrating communications node according to paragraph 34, wherein the biasing the selection of the second attachment point includes sending a re-establishment message to the first donor communications node.

Paragraph 36. A migrating communications node according to any of paragraphs 22 to 25, wherein communications nodes of the plurality of communications nodes other than the first donor communications node and the second donor communications node are formed from either radio network infrastructure equipment of the wireless communications network or communications devices acting as relay nodes for the one or more communications devices and forming the wireless backhaul network using radio communications resources provided by the donor communications nodes.

Paragraph 37. A migrating communications node according to any of paragraphs 22 to 26, wherein the migrating communications node is a communications device and the first and second attachment points correspond to sidelink interfaces.

Paragraph 38. A migrating communications node according to any of paragraphs 22 to 26, wherein the migrating communications node is formed from radio network infrastructure equipment.

Paragraph 39. A first of a plurality of communications nodes configured to form a wireless backhaul network in a wireless communications network, at least the first and a second of the plurality of communications nodes being donor communications nodes formed from radio network infrastructure equipment having a physical connection to a core network of the wireless communications network, the first communications node comprising receiver circuitry configured to receive data from the core network or one or more communications devices;

transmitter circuitry configured to transmit data to the core network or the one or more communications devices;

controller circuitry configured to determine that a migrating communications node should migrate from a first attachment point in the wireless backhaul network in which the migrating node communicates the data to or from the core network via the first donor communications node, determine a second attachment point in the wireless backhaul network to which the migrating communications node should attach to the wireless backhaul network to communicate the data to or from the core network, and instruct the migrating communications node to migrate from the first attachment point to the second attachment point, wherein the migrating communications node is provided with radio communications resources from the first donor communications node when attached to the wireless backhaul network at the first attachment point, and the determining the second attachment point includes biasing a selection of the second attachment point either to provide the migrating communications node with radio communications resources from the first donor communications node when attached to the wireless backhaul network at the second attachment point as an intra-donor migration, or to provide the migrating communications node with radio communications resources from the second donor communications node when attached to the wireless backhaul network at the second attachment point as an inter-donor migration.

Paragraph 40. A first communications node according to paragraph 39, wherein the first attachment point comprises a radio communications link between the migrating communications node and one of the plurality of communications nodes other than the second donor communications node, the radio communications link providing wireless transmission of the data to the core network or wireless reception of the data from the core network.

Paragraph 41. A first communications node according to any of paragraphs 39 or 40, wherein the second attachment point comprises a radio communications link between the migrating communications node and one of the plurality of communications nodes other than the first donor communications node, the radio communications link providing wireless transmission of the data to the core network or wireless reception of the data from the core network.

Paragraph 42. A first communications node according to any of paragraphs 39 to 41, wherein the determining the second attachment point in the wireless backhaul network to which the migrating communications node should attach to the wireless backhaul network to communicate the data to or from the core network includes selecting a route from a plurality of candidate routes for communicating the data between the migrating communications node and the core network based on a route cost calculated for each of the plurality of candidate routes.

Paragraph 43. A first communications node according to paragraph 42, wherein the route cost for each of the plurality of candidate routes includes at one or more of:
- an estimated time for communicating the data between the migrating communications node and the core network;
- an amount available radio resources available for communicating the data between the migrating communications node and the core network;
- a number of hops required to communicate the data between the migrating communications node and the core network.

Paragraph 44. A first communications node according to paragraph 42 or 43, wherein the biasing the selection of the second attachment point comprises
- including an intra-node migration cost and an inter-node migration cost in the route cost for the plurality of candidate routes for communicating the data between the migrating communications node and the core network.

Paragraph 45. A first communications node according to paragraph 44, wherein the biasing the selection of the second attachment point comprises
- assigning a weight to the intra-node migration cost and the inter-node migration relative to the estimated time, the amount of radio resources available and the number of hops required for communicating the data between the migrating communications node and the core network.

Paragraph 46. A first communications node according to paragraph 45, wherein the weight assigned to the inter-node migration cost is higher than the weight assigned to the intra-node migration cost in a case where the data communicated between the migrating communications node and the core network has a stringent quality of service, QoS, requirement.

Paragraph 47. A first communications node according to any of paragraphs 39 to 42, wherein the determining the second attachment point in the wireless backhaul network to which the migrating communications node should attach to the wireless backhaul network to communicate the data to or from the core network includes
- selecting a route of a plurality of candidate routes for communicating data between the migrating communications node and the core network based on an indication of whether each of the plurality of candidate routes involve an inter-donor migration or an intra-donor migration included in a routing table maintained at the first donor node.

Paragraph 48. A first communications node according to any of paragraphs 39 to 47, wherein the transmitter circuitry is configured to transmit, to the migrating communications node via the first attachment point, a donor indicator indicating that the migrating communications node is attached to the first donor node via the first attachment point.

Paragraph 49. A first communications node according to paragraph 48, wherein the donor indicator includes an indication of one or more service requirements for communicating data between the migrating node and the core network.

Paragraph 50. A first communications node according to paragraph 39, wherein the determining that the migrating communications node should migrate from the first attachment point comprises detecting one or more of a radio link failure (RLF), a topology update, a change in a route for communicating the data between the migrating node and the core network and a change in a mobility status of the migrating node.

Paragraph 51. A first communications node according to paragraph 50, wherein the biasing the selection of the second attachment point includes sending a re-establishment message to the first donor communications node.

Paragraph 52. A first communications node according to any of paragraphs 39 to 42, wherein communications nodes of the plurality of communications nodes other than the first donor communications node and the second donor communications node are formed from either radio network infrastructure equipment of the wireless communications network or communications devices acting as relay nodes for the one or more communications devices and forming the wireless backhaul network using radio communications resources provided by the donor communications nodes.

Paragraph 53. A first communications node according to any of paragraphs 39 to 43, wherein the migrating communications node is a communications device and the first and second attachment points correspond to sidelink interfaces.

Paragraph 54. A first communications node according to any of paragraphs 39 to 43, wherein the migrating communications node is formed from radio network infrastructure equipment.

Paragraph 55. A system comprising a first donor communications node, a second donor communications node and a migrating communications node according to paragraph 22 or 39.

Paragraph 56. A computer program comprising instructions which, when the program is executed by a computer, cause the computer to carry out the method of paragraph 1.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009.
[2] RP-161901, "Revised work item proposal: Enhancements of NB-IoT", Huawei, HiSilicon, 3GPP TSG RAN Meeting #73, New Orleans, USA, Sep. 19-22, 2016.
[3] RP-170831, "New SID Proposal: Study on Integrated Access and Backhaul for NR", AT&T, 3GPP RAN Meeting #75, Dubrovnik, Croatia, March 2017.
[4] 3GPP TTR 38.874 "$3^{rd}$ Generation Partnership Project; Technical Specification Group Radio Access Network; Study on Integrated Access and Backhaul; (Release 15)", $3^{rd}$ Generation Partnership Project, February 2018.

[5] R2-1801606, "Proposals on IAB Architecture", Qualcomm et al, 3GPP TSG-RAN WG2 NR Ad hoc 1801, Vancouver, Canada, Jan. 22-26, 2018.
[6] R3-181502, "Way Forward—IAB Architecture for L2/3 relaying", Qualcomm et al, 3GPP TSG-RAN WG3 Meeting #99, Athens, Greece, Feb. 26-Mar. 2, 2018.
[7] "802.1Q-2014—Bridges and Bridged Networks", IEEE, December 2014.

What is claimed is:

1. A method of communicating in a wireless communications network, the method comprising
configuring a plurality of communications nodes to form a wireless backhaul network to communicate data from a core network of the wireless communications network for transmitting to one or more communications devices or to communicate data to the core network received from the one or more communications devices, at least a first and a second of the plurality of communications nodes being donor communications nodes formed from radio network infrastructure equipment having a physical connection to the core network,
determining that a migrating communications node should migrate from a first attachment point in the wireless backhaul network in which the migrating node communicates the data to or from the core network via the first donor communications node,
determining a second attachment point in the wireless backhaul network to which the migrating communications node should attach to the wireless backhaul network to communicate the data to or from the core network, and
migrating the communications node from the first attachment point to the second attachment point, wherein the migrating communications node is provided with radio communications resources from the first donor communications node when attached to the wireless backhaul network at the first attachment point, and the determining the second attachment point includes
biasing a selection of the second attachment point either to provide the migrating communications node with radio communications resources from the first donor communications node when attached to the wireless backhaul network at the second attachment point as an intra-donor migration, or
to provide the migrating communications node with radio communications resources from the second donor communications node when attached to the wireless backhaul network at the second attachment point as an inter-donor migration.

2. A method according to claim 1, wherein the first attachment point comprises a radio communications link between the migrating communications node and one of the plurality of communications nodes other than the second donor communications node, the radio communications link providing wireless transmission of the data to the core network or wireless reception of the data from the core network.

3. A method according to claim 2, wherein the second attachment point comprises a radio communications link between the migrating communications node and one of the plurality of communications nodes other than the first donor communications node, the radio communications link providing wireless transmission of the data to the core network or wireless reception of the data from the core network.

4. A method according to claim 3, wherein the determining the second attachment point in the wireless backhaul network to which the migrating communications node should attach to the wireless backhaul network to communicate the data to or from the core network includes
selecting a route from a plurality of candidate routes for communicating the data between the migrating communications node and the core network based on a route cost calculated for each of the plurality of candidate routes.

5. A method according to claim 4, wherein the route cost for each of the plurality of candidate routes includes at one or more of:
an estimated time for communicating the data between the migrating communications node and the core network;
an amount available radio resources available for communicating the data between the migrating communications node and the core network;
a number of hops required to communicate the data between the migrating communications node and the core network.

6. A method according to claim 5, wherein the biasing the selection of the second attachment point comprises
including an intra-node migration cost and an inter-node migration cost in the route cost for the plurality of candidate routes for communicating the data between the migrating communications node and the core network.

7. A method according to claim 6, wherein the biasing the selection of the second attachment point comprises
assigning a weight to the intra-node migration cost and the inter-node migration relative to the estimated time, the amount of radio resources available and the number of hops required for communicating the data between the migrating communications node and the core network.

8. A method according to claim 7, wherein the weight assigned to the inter-node migration cost is higher than the weight assigned to the intra-node migration cost in a case where the data communicated between the migrating communications node and the core network has a stringent quality of service, QoS, requirement.

9. A method according to claim 3, wherein the determining the second attachment point in the wireless backhaul network to which the migrating communications node should attach to the wireless backhaul network to communicate the data to or from the core network includes
selecting a route of a plurality of candidate routes for communicating data between the migrating communications node and the core network based on an indication of whether each of the plurality of candidate routes involve an inter-donor migration or an intra-donor migration included in a routing table maintained at the first donor communications node or received from the first donor communications node by the migrating communications node via the first attachment point.

10. A method according to claim 1, comprising
receiving by the migrating communications node, from the first donor communications node via the first attachment point, a donor indicator indicating that the migrating communications node is attached to the first donor node via the first attachment point.

11. A method according to claim 1, wherein the determining that the migrating communications node should migrate from the first attachment point comprises detecting one or more of a radio link failure (RLF), a topology update, a change in a route for communicating the data between the migrating node and the core network and a change in a mobility status of the migrating node.

12. A method according to claim 1, wherein communications nodes of the plurality of communications nodes other than the first donor communications node and the second donor communications node are formed from either radio network infrastructure equipment of the wireless communications network or communications devices acting as relay nodes for the one or more communications devices and forming the wireless backhaul network using radio communications resources provided by the donor communications nodes.

13. A method according to claim 1, wherein the migrating communications node is a communications device and the first and second attachment points correspond to sidelink interfaces.

14. A method according to claim 1, wherein the migrating communications node is formed from radio network infrastructure equipment.

15. A method according to claim 1, wherein the determining the second attachment point in the wireless backhaul network to which the migrating communications node should attach to the wireless backhaul network to communicate the data to or from the core network is performed by the first donor communications node.

16. A method according to claim 1, wherein the determining the second attachment point in the wireless backhaul network to which the migrating communications node should attach to the wireless backhaul network to communicate the data to or from the core network is performed by the migrating communications node.

17. A method according to claim 1, wherein the determining that a migrating communications node should migrate from a first attachment point in the wireless backhaul network in which the migrating node communicates the data to or from the core network via the first donor communications node is performed by the first donor communications node.

18. A method according to claim 1, wherein the determining that a migrating communications node should migrate from a first attachment point in the wireless backhaul network in which the migrating node communicates the data to or from the core network via the first donor communications node is performed by the migrating communications node.

19. A migrating communications node of a plurality of communications nodes configured to form a wireless backhaul network in a wireless communications network, the plurality of communications nodes including at least a first and a second of the plurality of communications nodes being donor communications nodes formed from radio network infrastructure equipment having a physical connection to a core network of the wireless communications network, the migrating communications node comprising receiver circuitry configured to receive data from the core network or one or more communications devices;

transmitter circuitry configured to transmit data to the core network or the one or more communications devices;

controller circuitry configured to determine that the migrating communications node should migrate from a first attachment point in the wireless backhaul network in which the migrating node communicates the data to or from the core network via the first donor communications node, to determine a second attachment point in the wireless backhaul network to which the migrating communications node should attach to the wireless backhaul network to communicate the data to or from the core network, and to migrate from the first attachment point to the second attachment point, wherein the migrating communications node is provided with radio communications resources from the first donor communications node when attached to the wireless backhaul network at the first attachment point, and the determining the second attachment point includes biasing a selection of the second attachment point either to provide the migrating communications node with radio communications resources from the first donor communications node when attached to the wireless backhaul network at the second attachment point as an intra-donor migration, or to provide the migrating communications node with radio communications resources from the second donor communications node when attached to the wireless backhaul network at the second attachment point as an inter-donor migration.

20. A computer program comprising instructions which, when the program is executed by a computer, cause the computer to carry out the method of claim 1.

* * * * *